(12) United States Patent  
Wechsler et al.

(10) Patent No.: US 8,194,938 B2  
(45) Date of Patent: Jun. 5, 2012

(54) FACE AUTHENTICATION USING RECOGNITION-BY-PARTS, BOOSTING, AND TRANSDUCTION

(75) Inventors: Harry Wechsler, Fairfax, VA (US); Fayin Li, Fairfax, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 254 days.

(21) Appl. No.: 12/791,162

(22) Filed: Jun. 1, 2010

(65) Prior Publication Data

US 2011/0135166 A1    Jun. 9, 2011

Related U.S. Application Data

(60) Provisional application No. 61/183,105, filed on Jun. 2, 2009.

(51) Int. Cl.  
*G06K 9/00*    (2006.01)

(52) U.S. Cl. .......................................................... 382/118
(58) Field of Classification Search .................. None  
See application file for complete search history.

(56) References Cited

U.S. PATENT DOCUMENTS

| | | | |
|---|---|---|---|
| 5,850,470 A * | 12/1998 | Kung et al. | 382/157 |
| 6,181,806 B1 * | 1/2001 | Kado et al. | 382/118 |
| 7,492,943 B2 * | 2/2009 | Li et al. | 382/159 |
| 7,711,158 B2 * | 5/2010 | Ahn et al. | 382/124 |
| 2009/0196510 A1 * | 8/2009 | Gokturk et al. | 382/224 |
| 2010/0284577 A1 * | 11/2010 | Hua et al. | 382/118 |
| 2011/0299745 A1 * | 12/2011 | Roberts et al. | 382/128 |

\* cited by examiner

*Primary Examiner* — Vikkram Bali  
(74) *Attorney, Agent, or Firm* — David Yee; David Grossman

(57) ABSTRACT

A robust recognition-by-parts authentication system for comparing and authenticating a test image with at least one training image is disclosed. This invention applies the concepts of recognition-by-parts, boosting, and transduction.

18 Claims, 14 Drawing Sheets

(a)

(b)

(c)

(a) (b)

FACE AUTHENTICATION USING RECOGNITION-BY-PARTS, BOOSTING, AND TRANSDUCTION

CROSS-REFERENCE TO RELATED APPLICATIONS

This present application claims the benefit of provisional patent application Ser. No. 61/183,105 to Wechsler et al., filed on Jun. 2, 2009, entitled "Face Authentication Using Recognition-by-Parts, Boosting, and Transduction," which is hereby incorporated by reference.

BACKGROUND OF THE INVENTION

The present invention relates to field of face recognition systems. More specifically, the present invention robustly authenticates facial images by using recognition-by-parts, boosting, and transduction.

Understanding how people process and recognize each other's face and developing robust face recognition systems still remain a grand challenge for computational intelligence, in general, and computer vision, in particular. The face recognition challenge belongs to biometrics, the science of authenticating people from measuring their physical or external appearance. In addition to security and surveillance, the ability to recognize living creatures has also become a critical enabling technology for a wide range of applications that includes defense, health care, human-computer interaction, image retrieval and data mining, industrial and personal robotics, and transportation.

Face recognition is largely motivated by the need for surveillance and security, telecommunication and digital libraries, human-computer intelligent interaction, and smart environments. Some of these security uses may include log in control and physical access control. Additional applications may include law enforcement purposes, such as mug shot albums, criminology, and commercial transactions that involve the use of credit cards, driver's licenses, passports, or other photo identifications. Virtually all applications that depend upon the identification of a person could benefit from this technology.

The solutions suggested so far are synergetic efforts from fields, such as signal and image processing, pattern recognition, machine learning, neural networks, statistics, evolutionary computation, psychophysics of human perception and neurosciences, and system engineering. A generic approach often used involves statistical estimation and the learning of face class statistics for subsequent face detection and classification. Face detection generally applies a statistical characterization of faces and non-faces to build a classifier, which may then be used to search over different locations and scales for image patterns that are likely to be human faces.

Face recognition usually employs various statistical techniques to derive appearance-based models for classification. Some of these techniques include, but are not limited to, Principal Component Analysis (hereinafter referred to as PCA); Fisher Linear Discriminant (hereinafter referred to as FLD), which is also known as Linear Discriminant Analysis (hereinafter referred to as LDA); Independent Component Analysis (hereinafter referred to as ICA); Local Feature Analysis (hereinafter referred to as LFA); and Gabor and bunch graphs. Descriptions of PCA may be found in: [M. Turk and A. Pentland, "Eigenfaces for Recognition," 13 J. Cognitive Neurosci, 71-86 (1991], and [B. Moghaddam and A. Pentland, "Probabilistic Visual Learning for Object Representation," 19 IEEE Trans. Pattern Analysis and Machine Intel. 696-710 (1997)]. Descriptions of FLD and LDA may be found in: [D. L. Swets and J. Weng, "Using Discriminant Eigenfeatures for Image Retrieval," 18 IEEE Trans. Pattern Analysis and Machine Intel 831-36 (1996)]; [P. N. Belhumeur et al., "Eigenfaces vs. Fisherfaces: Recognition Using Class Specific Linear Projection," 19 IEEE Trans. Pattern Analysis and Machine Intel 711-20 (1997)], and [K. Etemad and R. Chellappa, "Discriminant Analysis for Recognition of Human Face Images," 14 J. Opt. Soc. Am. A 1724-33 (1997)]. A description of ICA may be found in: [G. Donato et al., "Classifying Facial Actions," 21 IEEE Trans. Pattern Analysis and Machine Intel 974-89 (1999)]. LFA is described in: [P. S. Penev and J. J. Atick, "Local Feature Analysis: A General Statistical Theory for Object Representation," 7 Network: Computation in Neural Sys. 477-500 (1996).]

Face recognition may depend heavily on the particular choice of features used by the classifier. One usually starts with a given set of features and then attempts to derive an optimal subset (under some criteria) of features leading to high classification performance with the expectation that similar performance may be also displayed on future trials using novel (unseen) test data. PCA is a popular technique used to derive a starting set of features for both face representation and recognition. Kirby and Sirovich showed that any particular face may be (i) economically represented along the eigenpictures coordinate space, and (ii) approximately reconstructed using just a small collection of eigenpictures and their corresponding projections ('coefficients'). [M. Kirby and L. Sirovich, "Application of the Karhunen-Loeve Procedure for the Characterization of Human Faces," 12 IEEE Trans. Pattern Analysis and Machine Intel 103-08 (1990)].

Applying the PCA technique to face recognition, Turk and Pentland developed a well-known eigenface method that sparked an explosion of interests in applying statistical techniques to face recognition. However, PCA, an optimal representation criterion (in the sense of mean square error), does not consider the classification aspect. One solution for taking into account and improving the classification performance is to combine PCA, the optimal representation criterion, with the Bayes classifier, the optimal classification criterion (when the density functions are given). Toward that end, Moghaddam and Pentland developed a probabilistic visual learning method, which uses the eigenspace decomposition as an integral part of estimating complete density functions in high-dimensional image space. While the leading eigenvalues are derived directly by PCA, the remainder of the eigenvalue spectrum is estimated by curve fitting.

Rather than estimating the densities in high-dimensional space, Liu and Wechsler developed a PRM (Probabilistic Reasoning Model) method by first applying PCA for dimensionality reduction and then applying the Bayes classifier and the MAP rule for classification. [C. Liu and H. Wechsler, "Robust Coding Schemes for Indexing and Retrieval from Large Face Databases," 9 IEEE Trans. Image Processing 132-37 (2000)]. The rationale of the PRM method is that of lowering the space dimension subject to increased fitness for the discrimination index by estimating the conditional density function of each class using the within-class scatter in the reduced PCA space.

Another important statistical technique widely used in face recognition is the FLD (or LDA), which models both the within- and the between-class scatters. FLD, which is behind several face recognition methods, induces non-orthogonal projection bases, a characteristic known to have great functional significance in biological sensory systems [J. G. Daugman, "An Information-Theoretic View of Analog Representation in Striate Cortex," Computational Neuroscience 403-24 (MIT Press 1990)]. As the original image space is highly dimensional, most face recognition methods perform first dimensionality reduction using PCA, as it is the case with the Fisherfaces method suggested by Belhumeur et al. Swets and Weng have pointed out that the eigenfaces method derives only the Most Expressive Features (MEF) and that PCA inspired features do not necessarily provide for good discrimination. As a consequence, the subsequent FLD projections are used to build the Most Discriminating Features (MDF) classification space. The MDF space is, however, superior to the MEF space for face recognition only when the training images are representative of the range of face (class) variations. Otherwise, the performance difference between the MEF and MDF is not significant.

The drawback of FLD is that it requires large sample sizes for good generalization. For a face recognition problem, however, usually there are a large number of faces (classes), but only a few training examples per face. One possible remedy for this drawback, according to Etemad and Chellappa, is to artificially generate additional data and thus increase the sample size. Yet another remedy, according to Liu and Wechsler, is to improve FLD's generalization performance by balancing the need for adequate signal representation and subsequent classification performance using sensitivity analysis on the spectral range of the within-class eigenvalues.

Other developments, which are conceptually relevant to the face recognition community in general, include LFA, and the related Dynamic Link Architecture (hereinafter referred to as DLA) [M. Lades et al., "Distortion Invariant Object Recognition in the Dynamic Link Architecture," 42 IEEE Trans. Computers 300-11 (1993)], and elastic graph matching methods [L. Wiskott et al., "Face Recognition by Elastic Bunch Graph Matching," 19 IEEE Trans. Pattern Analysis and Machine Intel 775-79 (1997)]. LFA uses a sparse version of the PCA transform, followed by a discriminative network. DLA starts by computing Gabor jets, and then it performs a flexible template comparison between the resulting image decompositions using graph-matching.

While each of these techniques aid in face recognition, they are slow. Thus, what is needed is a face authentication system that can address these problems efficiently and economically.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

Embodiments of the present invention address the problem of face authentication. Much of this disclosure discusses the embodiments with respect to face recognition and authentication. A new robust recognition-by-parts face authentication system, device, and method embedded in a physical and tangible computer readable medium are introduced that may be used to aid recognition.

As a robust recognition-by-parts face authentication system 105, it is a physical architecture with each component of the architecture being a physical module. An example of the system can be a machine that comprises a multitude of machines or modules with specific, individual responsibilities that can communicate with one another. The robust recognition-by-parts face authentication system 105 determines if at least one query image obtained using an imaging device (e.g., camera, video, recorder, etc.) matches at least one training image in an enrollment gallery. The enrollment gallery serves as a gallery filled with a multitude of training images, which may be used for comparison, matching, and authentication purposes.

Like the system 105, the present invention can be a device (e.g., a handheld device for identifying an individual, etc.) 305. The present invention can also be a physical and tangible computer readable medium (e.g., computer program product, etc.) 505 with instructions for determining if at least one query image obtained using an imaging device (e.g., camera, video, recorder, etc.) matches at least one training image in an enrollment gallery.

The following meanings are within the scope of the present invention. Robust means the present invention's ability to handle query images that may have been altered. Alteration can be either occlusion (meaning incomplete) or disguised (meaning corrupt).

The terms "test" and "query" can be used interchangeably. Moreover, the terms "feature" and "patch" can be used interchangeably.

Figure 1:
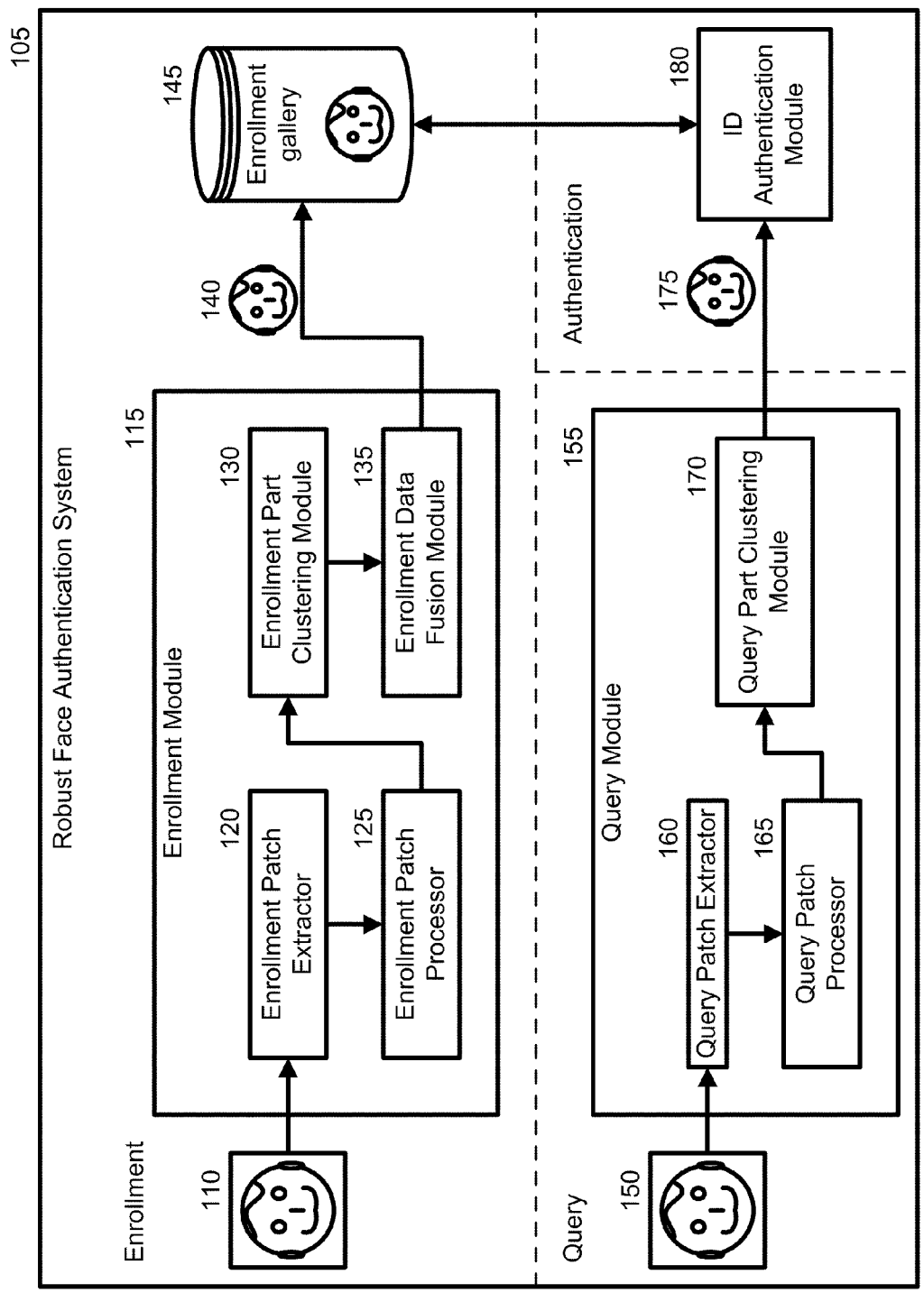
FIG. 1 is a block diagram showing a robust face authentication system.
Figure 2:
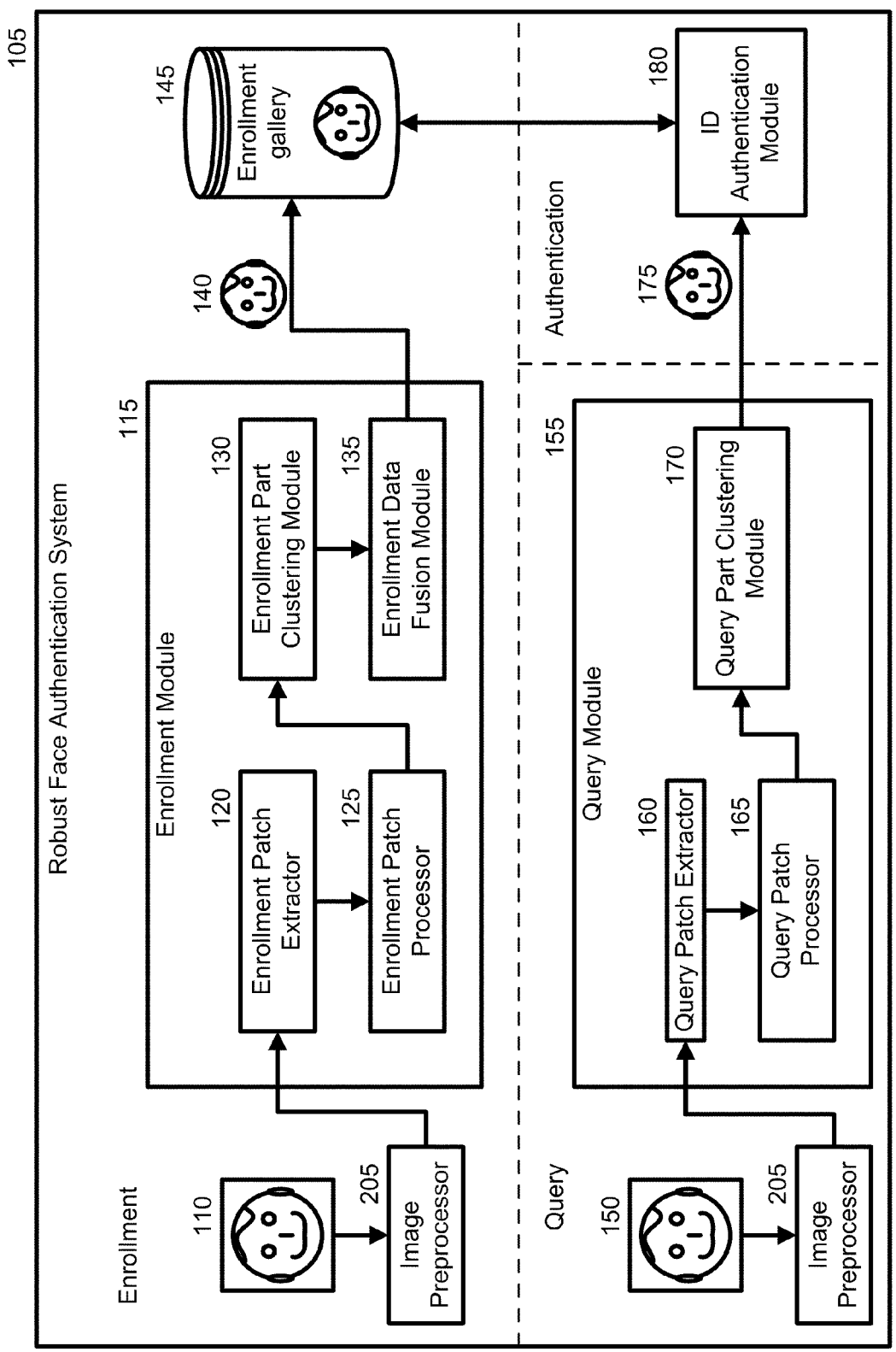
FIG. 2 is a block diagram showing another aspect of a robust face authentication system.
Figure 3:
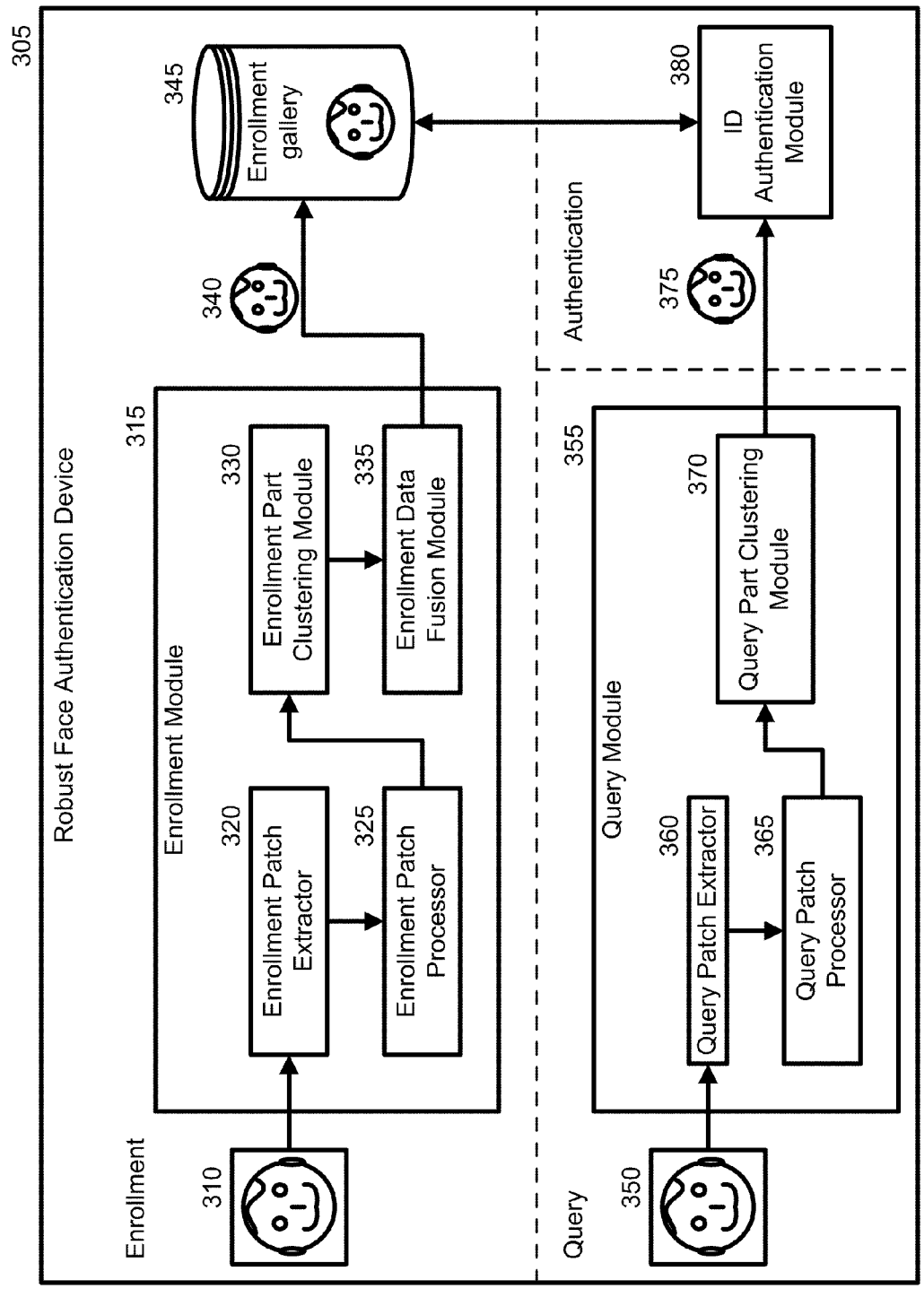
FIG. 3 is a block diagram showing a robust authentication device.
Figure 4:
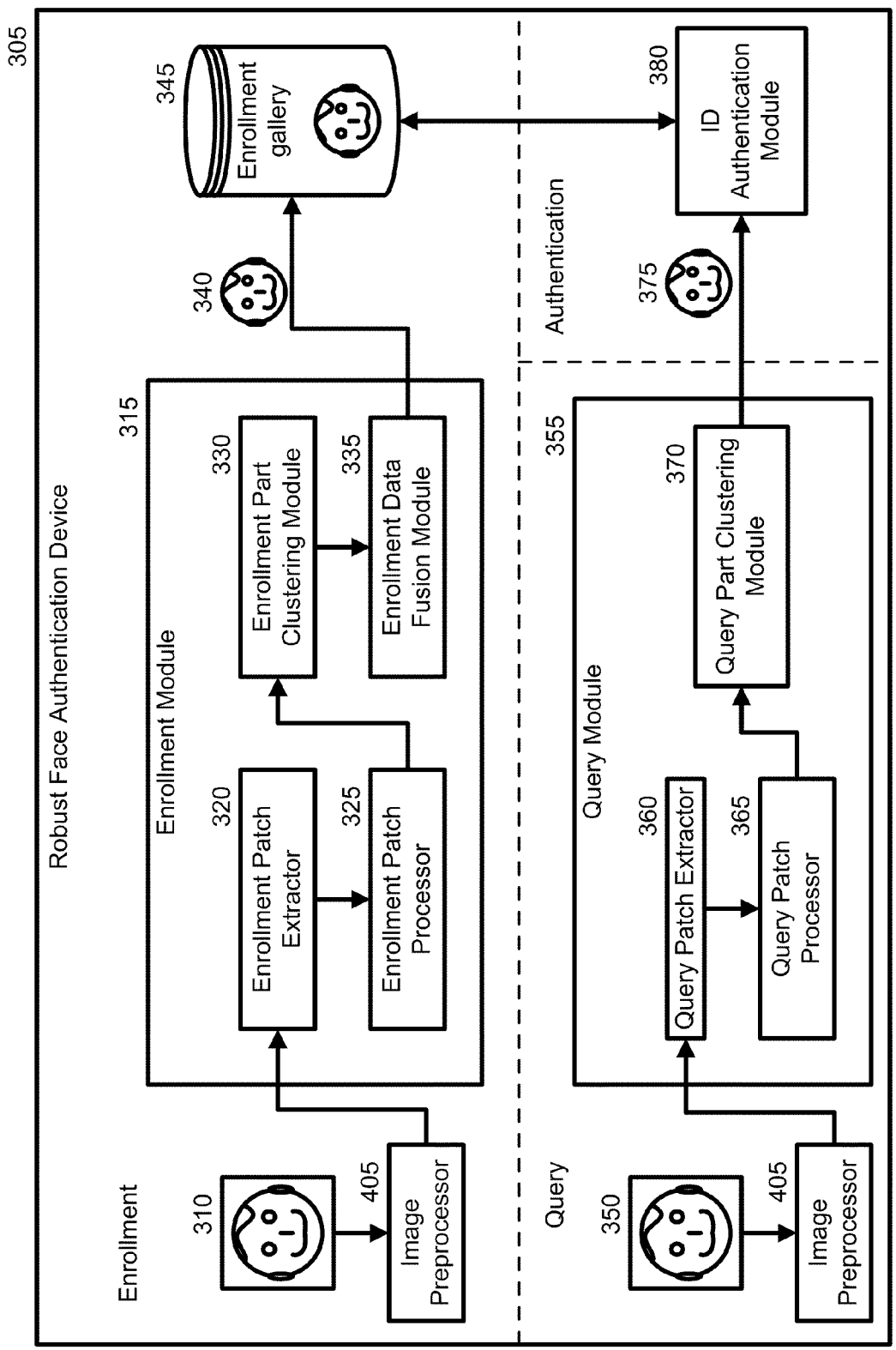
FIG. 4 is a block diagram showing another aspect of a robust face authentication device.

Referring to FIGS. 1-2, the present invention as a robust recognition-by-parts face authentication system (physical architecture) 105 may comprise an enrollment module 115, an query module 155, and an ID authentication module 180. Likewise, referring to FIGS. 3-4, the present invention as a robust recognition-by-parts face authentication device 305 may comprise an enrollment module 315, an query module 355, and an ID authentication module 380. Both the system 105 and the device 305 may have one or more of each of these modules. Both the system 105 and device 305 can determine if at least one query image 150, 350 obtained using an imaging device matches at least one training image in an enrollment gallery 145, 345.

The enrollment module 115, 315 may include an enrollment patch extractor 120, 320, an enrollment patch processor 125, 325, an enrollment part clustering module 130, 330, and an enrollment data fusion module 135, 335. The enrollment patch extractor 120, 320 may be configured for extracting a multitude of training patches at different scales for each center position of the training image. To extract the training patches, the enrollment patch extractor 120, 320 can use SIFT or Gabor wavelet. The enrollment patch processor 125, 325 may be configured for selecting the training patches that are predictive (e.g., most informative) in identifying the training image and reducing the selected training patches' dimensionality using transduction. The enrollment part clustering module 130, 330 may be configured for clustering the selected training patches into training exemplar-based parts for matching and authentication using K-means. The enrollment data fusion module 135, 335 may be configured for enrolling the training exemplar-based parts 140, 340 using boosting and transduction.

The query module 155, 355 may include a query patch extractor 160, 360, a query patch processor 165, 365, and a query part clustering module 170, 370. The query patch extractor 160, 360 may be configured for extracting a multitude of query patches at different scales for each center position of the query image. To extract the query patches, the query patch extractor 160, 360 can use SIFT or Gabor wavelet. The query patch processor 165, 365 may be configured for selecting the query patches that are predictive in identifying the query target and reducing the selected query patches' dimensionality using transduction. The query part clustering module 170, 370 may be configured for clustering the selected query patches into query exemplar-based parts 175, 375 for matching and authentication using K-means.

The ID authentication module 180, 380 configured for matching the query exemplar-based parts 175, 375 against a gallery of all the enrolled training exemplar-based parts using flexible matching. Results can be displayed in the ID authentication module 180, 380 or in a separate module, such as a result module or an audio/video graphics apparatus (e.g., a monitor, tablet, touch screen display, etc.).

Where the clustered patches are those of a training image 110, 310, they may be enrolled in an enrollment gallery 145, 345. Where the clustered patches are those of a query image 150, 350, they are to be compared, matched, and authenticated against the training patches and/or training images in the enrollment gallery 145, 345 using the ID authentication module 180, 380. It should be noted that the present invention allows any patch of an image (or the image itself), whether a training image or a query image, to be enrolled in the enrollment gallery.

The present invention can also further include a training image preprocessor module 205. The training image preprocessor module 205 can be configured for preprocessing at least one training image 110, 310 by: converting 256 gray levels into floating points; using geometric normalization that lines up chosen eye coordinates; cropping the training image using an elliptical mask; equalizing a histogram of the training image 110, 310; and normalizing pixel values to mean zero and variance of one.

It is should be noted that the number of gray levels need not be 256. It can be 64, 128, etc.

The same image preprocessor module 205, 405 can also be configured for preprocessing at least one query image 150, 350.

Besides being a physical architecture, the present invention can also be implemented as a physical and tangible computer readable medium 505. The physical and tangible computer readable medium 505 may be encoded with instructions for robustly authenticating faces using recognition-by-parts, boosting, and transduction. Capable of being transferred and stored into the memory of a computer, computer processor or hard drive, these instructions robustly determines if at least one query image obtained using an imaging device (e.g., camera, video, recorder, etc.) matches at least one training image.

Examples of physical and tangible computer readable mediums include, but are not limited to, a compact disc (cd), digital versatile disc (dvd), usb flash drive, floppy disk, random access memory (RAM), read-only memory (ROM), erasable programmable read-only memory (EPROM), optical fiber, etc. It should be noted that the tangible computer readable medium may even be any suitable medium in which the instructions can be electronically captured, such as optical scanning. Where optical scanning occurs, the instructions may be compiled, interpreted, or otherwise processed in a suitable manner, if necessary, and then stored in computer memory.

The instructions may be written using any computer language or format. Nonlimiting examples of computer languages include Ada, Ajax, C++, Cobol, Java, Python, XML, etc.

The instruction execution system may be any apparatus (such as a computer or processor) or "other device" that is configured or configurable to execute embedded instructions. Examples of "other device" include, but are not limited to, PDA, cd player/drive, dvd player/drive, cell phone, etc.

Figure 5:
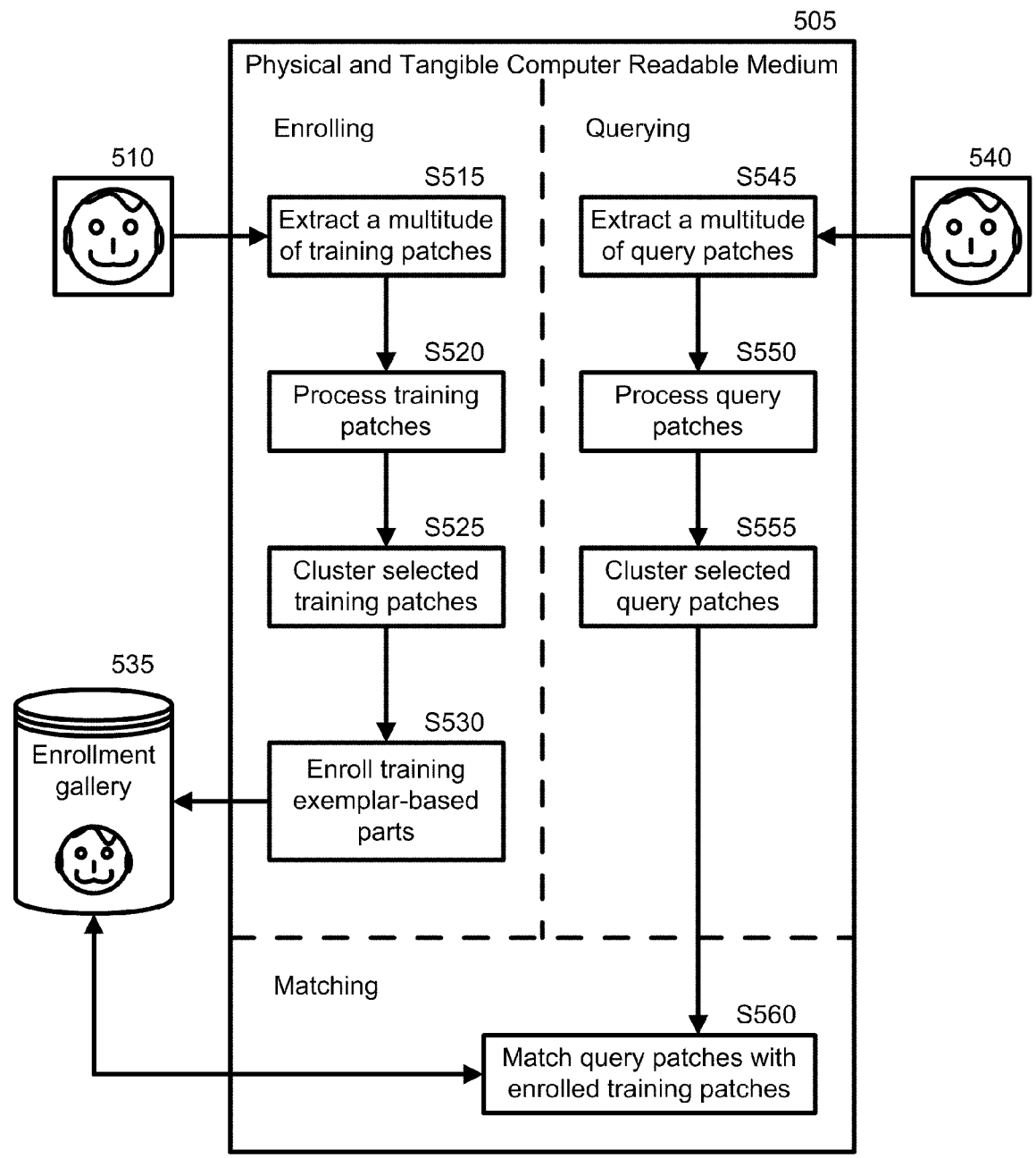
FIG. 5 is a block diagram showing a physical and tangible computer readable medium with instructions for face authentication.
Figure 6:
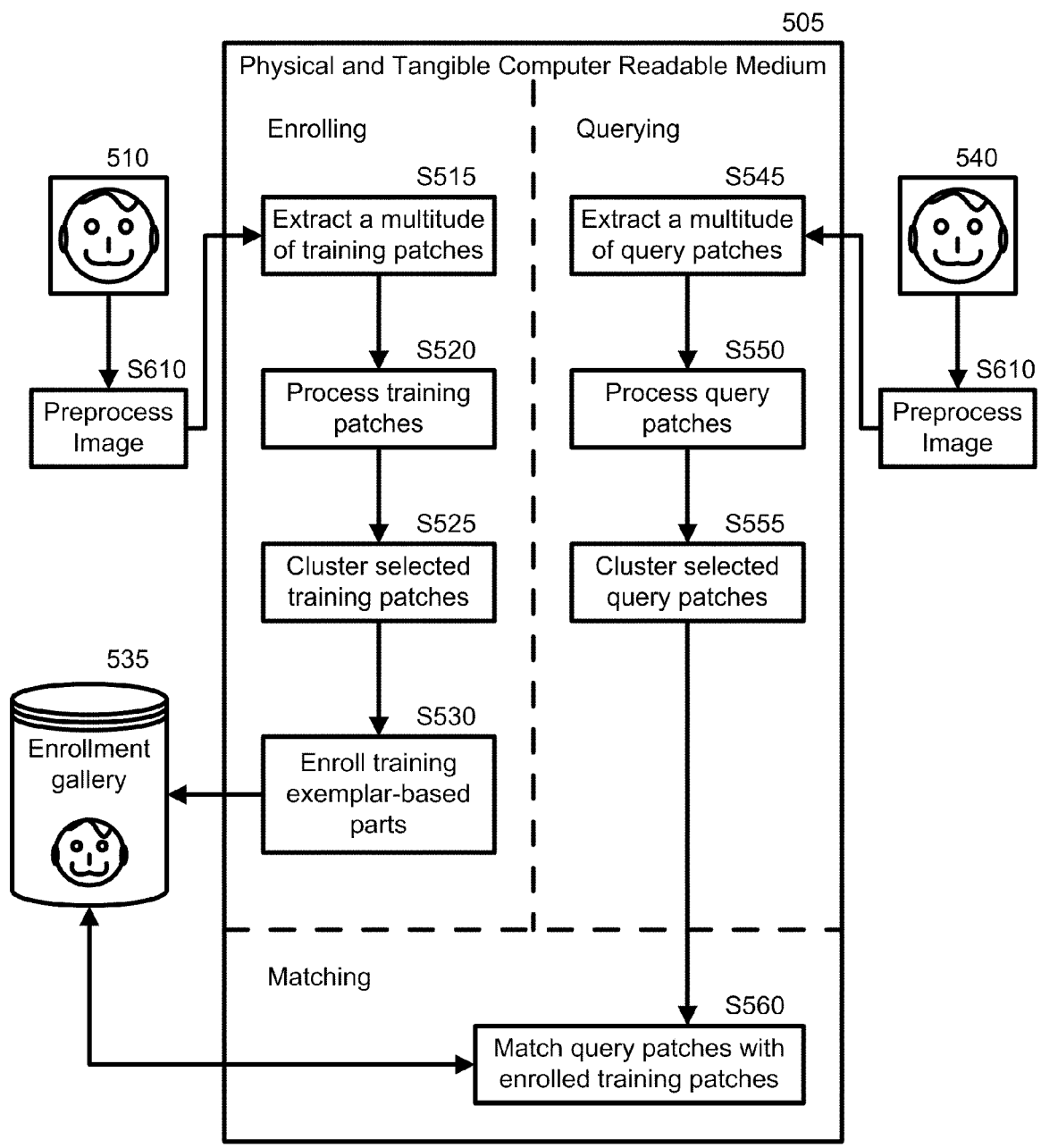
FIG. 6 is a block diagram showing another aspect of a physical and tangible computer readable medium with instructions for robust face authentication.

As illustrated in FIGS. 5-6, upon execution of the instructions, one or more processors may enroll S530 extracted S515, processed S520, and clustered training patches S525; extract S545, process S550, and cluster query patches S555; and match these query patches with training patches S560.

More specifically, the following instructions may take place for the training patches when executed: (a) extract a multitude of training patches at different scales for each center position of the training image S515; (b) process the training patches by (1) selecting the training patches that are predictive in identifying the training image and (2) reducing the selected training patches' dimensionality using transduction S520; (c) cluster the selected training patches into training exemplar-based parts for matching and authentication using K-means S525; (d) enroll the training exemplar-based parts using boosting and transduction S530. The training exemplar-based parts may be enrolled into an enrollment gallery 535 and stored there until ready to be matched with query image(s) and/or query patch(es).

The following instructions may take place for the query patches when executed: (a) extract a multitude of query patches at different scales for each center position of the query image S545; (b) process the query patches by (1) selecting the query patches that are predictive in identifying the query target and (2) reducing the selected query patches' dimensionality using transduction S550; and (c) cluster the selected query patches into query exemplar-based parts for matching and authentication using K-means S555.

Thereafter, the following instruction may take place when executed: match the query exemplar-based parts against a gallery of all the enrolled training exemplar-based parts using flexible matching S560. Results can be displayed. The display may be a result module or an audio/video graphics apparatus (e.g., a monitor, tablet, touch screen display, etc.).

The instructions may include having the training patches extracted through the use of SIFT or Gabor wavelet. Similarly, the instructions may have the query patched extracted through the use of SIFT or Gabor wavelet.

Where the clustered patches are those of a training image 510, they may be enrolled in an enrollment gallery 535. Where the clustered patches are those of a query image 540, they are to be compared, matched, and authenticated against the training patches and/or training images in the enrollment gallery 535. To accomplish this latter aspect, the present invention can further include instructions for matching and authenticating the results of the query patches S560 with the training patches and/or training image. It should be noted that the present invention allows any patch of an image (or the image itself), whether a training image or a query image, to be enrolled in the enrollment gallery.

Furthermore, the physical and tangible computer readable medium 505 can also include instructions for preprocessing S610 at least one training image 510. Preprocessing S610 may include: converting 256 gray levels into floating points; using geometric normalization that lines up chosen eye coordinates; cropping the training image using an elliptical mask; equalizing a histogram of the training image; and normalizing pixel values to mean zero and variance of one. Like above, it is should be noted that the number of gray levels need not be 256. It can be 64, 128, etc.

The present invention can also further include instructions for preprocessing at least one query image 540, S610. Only this time, the preprocessing described above involves a query image instead of a training image.

I. INTRODUCTION

Overall, the present invention deals with an integrated recognition-by-parts architecture for reliable and robust face recognition. Reliability and robustness are characteristic of the ability to deploy full-fledged and operational biometric engines, and handling adverse image conditions that include, among others, uncooperative subjects, occlusion, disguise, and temporal variability, respectively.

The architecture of the present invention is model-free and non-parametric. Its framework can draw support from discriminative methods using likelihood ratios. At the conceptual level, it can link forensics and biometrics, while at the implementation level it can link the Bayesian framework and statistical learning theory (SLT).

Layered categorization starts with face detection using implicit segmentation, rather than explicit segmentation. It proceeds with face authentication that involves feature selection of local patch instances including dimensionality reduction, exemplar-based clustering of patches into parts, and data fusion for matching using boosting that aggregates parts playing the role of weak learners.

Face authentication shares the same implementation with face detection. Driven by transduction, implementation employs proximity and typicality (for ranking) realized using strangeness and p-values, respectively. The feasibility and reliability of the proposed model-free and non-parametric architecture may be illustrated using face recognition grand challenge (FRGC) data.

II. BIOMETRIC SPACE

The biometrics processing space can be conceptualized as an n-D space with its axes indexing variability along dimensions that are related to the data acquisition conditions encountered during enrollment and testing. The axes describe, among others, the geometry used during image acquisition. Examples include, but are not limited to, pose, illumination, and expression (PIE); motion and/or temporal change; and the impact of un-cooperative subjects (e.g., impostors).

Image variability and correspondence using precise alignment required for matching during authentication can be additional hurdles for object recognition, in general, and face recognition, in particular. Characteristic of un-cooperative subjects are occlusion and disguise or equivalently denial and deception. The above adverse conditions may affect the scope and performance of biometric analysis vis-à-vis both training and testing.

Deception, occlusion, and disguise represent major challenges yet to be addressed. Deception can be deliberate and used by impostors for nefarious purposes. Deception using disguise and/or camouflage is ubiquitous but diverse in nature. Essential for survival, deception is one of the forces that drives natural selection. It has been coined that "among all [these] evolutionary achievements, perhaps none are more important, more widely used, and more highly developed, than those characteristics which serve to elude, to attract, or to deceive the eye, and facilitate escape from enemies or the pursuit of prey." Deception is most effective in cluttered environments when it becomes easier to hide, thanks to many distracters. Image segmentation needed for (face) detection and location is NP and hard to implement. Face recognition in cluttered environments using implicit rather than explicit segmentation is thus highly valuable and can be accomplished using feature selection of image patches.

Occlusion and disguise are not always deliberate. Examples for accidental occlusion occur for crowded environments, e.g., CCTV, when only parts of faces are visible from time to time and not necessarily in the right sequence. Normal phenomena with deceptive impact include, for instance, bags under the eyes, which may affect eye location and thus face detection and normalization; wrinkles from aging, medical conditions (allergies, injuries, and moles), and fatigue; and facial hair.

Biometrics cannot continue to assume that the personal signatures used for face authentication are complete, constant, and time-invariant. Most clients are indeed legitimate and honest. They have nothing to hide, and have all the incentives to cooperate. The very purpose of biometrics, however, is to provide security from impostors seeking to breach security and/or from uncooperative subjects. Therefore, the overall challenge for biometrics is to expand the scope and utility of authentication engines by gradually removing unwarranted assumptions on the completeness and qualities of the biometric data captured. The scope for biometrics needs to include "ill-conditioned" surveillance, in addition to relatively "well-behaved" access control.

Realistic but adverse imaging conditions need to be accounted for before reliable face recognition engines become ready for deployment. Pinto et al. question the progress made, if any, in solving the real-world object recognition problem. The experimental data provided shows that "simpler recognition tests [designed] to better span the real-world variation in object pose, position, and scale expose the inadequacy of the [biologically motivated] V1-like model and demonstrate that tests based on uncontrolled 'natural' images can be seriously misleading [in claiming apparently impressive progress]." Claiming victory is premature according to the authors because "while the Caltech 101 set [and sets like it: e.g., Caltech 256 and Pascal VOC] certainly contains a large number of images, variations in object view, position, size, etc., between and within object category are poorly defined and are not varied systematically. Image backgrounds [also] strongly co-vary with object category." Most of the images in such sets are also "composed" photographs, with shots and framing not random. These types of shots greatly reduced the variability, and therefore, the complexity of the problem being solved. The corollary is the quest for "a renewed focus on the core problem of object recognition—real-world image variation." The concerns expressed above affect authentication engines and require extending further away their operation from the origin of the current n-D biometric space. Progress can be gauged only vis-à-vis imagery whose variability is realistic. Furthermore, progress may require that unwarranted modeling assumptions are not made. Thus, to get around these problems, the present invention teaches that model-free and non parametric methods need to be employed.

The working hypothesis for the (large) face recognition evaluations carried out so far has not been particularly concerned with the very possibility that subjects would seek to deny and/or foil their true biometric signatures. Object recognition, in general, and face recognition, in particular, can be, however, severely hampered by occlusion and disguise. Yet, large scale face recognition evaluations (e.g., FRVT2002, FRGC, FRVT2006, etc.) still do not consider occlusion and disguise for testing purposes. Singh et al. have recently showed the deleterious effects of disguise on biometric performance. The data used may come from AR (with some disguise accessories) or may be synthetically generated using Faces software. The best performance is usually achieved on face images with variation in expression, followed by occlusion with scarf, and images with glasses. The explanation for this finding is "there is only a small region in a face [which varies due to expression] and the rest of the face contributes to correct recognition." Such localization suggests using recognition-by-parts for architecture and local estimation using transduction for learning and prediction. Our recent evaluation studies have also shown that the performance displayed by well know face recognition methods, e.g., PCA and PCA+LDA ("Fisherfaces") deteriorates significantly as a result of disguise. Another related shortcoming of current biometrics is the use of closed set recognition where probes tend to find mates in the gallery.

As many of the concerns listed above affect only parts of the face, recognition-by parts methods appear most suitable for reliable face recognition. Recognition-by-parts facilitates authentication because it does not seek explicit invariance. Instead, it handles variability using component-based configurations that are flexible enough to compensate among others for limited pose changes, if any, and limited occlusion and disguise. The recognition-by-parts approach in the present invention is modeled using local estimation and cohort learning driven by transduction. Feature selection of local patch instances, clustering of patches as parts and their encoding using exemplar based representations, and authentication using boosting driven by parts that play the role of weak learners, are similar in their transduction driven implementation using the strangeness as a proximity measure.

III. LIKELIHOOD RATIO

The present invention incorporates likelihood ratio (LR) as the major building block for reliable and robust face recognition engines. As described throughout, the use of LR permeates all the processing stages. It covers image representation in terms of patch and parts selection, matching, and data fusion for decision-making. Motivation for LR comes from disparate sources, among them forensics and the discriminative approach for pattern recognition.

A. Forensics

Gonzales-Rodriguez et al. provide strong motivation from forensic sciences for the evidential and discriminative use of LR. They make the case for rigorous quantification of the process leading from evidence (and expert testimony) to decisions. Classical forensic reporting provides only "identification" or "exclusion/elimination" decisions. It has two main drawbacks. The first one is related to the use of subjective thresholds. If the forensic scientist is the one choosing the thresholds, she will be ignoring the prior probabilities related to the case, disregarding the evidence under analysis, and usurping the U.S. Supreme Court's (Court) decision that " . . . the use of thresholds is in essence a qualification of the acceptable level of reasonable doubt adopted by the expert". The second drawback is the large amount of non-reporting or inconclusive cases that this identification/exclusion process has induced.

The Bayesian approach's use of LR avoids the above drawbacks. The roles of the forensic scientist and the judge/jury are now clearly separated. What the Court wants to know are the posterior odds in favor of the prosecution proposition (P) against the defense (D) [posterior odds=LR×prior odds]. The prior odds concern the Court (background information relative to the case), while LR, which indicates the strength of support from the evidence, is provided by the forensic scientist.

The forensic scientist cannot infer the identity of the probe from the analysis of the scientific evidence, but gives the Court the LR for the two competing hypothesis (P and D). As the slope of the Receiver Operating Characteristic (ROC) curve is equal to likelihood ratio, the authentication performance and the likelihood ratio are closely related. LR also serves as an indicator of the discriminating power (similar in use to Tippett plots) for the forensic engine. Thus, it can be used to comparatively assess authentication performance.

The use of LR has also been motivated recently by specific linkages between biometrics and forensics with the evidence evaluated using a probabilistic framework. Forensic inferences correspond now to authentication, exclusion, or inconclusive outcomes and are based on the strength of biometric (filtering) evidence accrued by prosecution and defense competing against each other. The evidence consists of concordances and discordances for the components making up the facial landscape. The use of the LR draws further support from the Court's Daubert ruling on the admissibility of scientific evidence. The Daubert ruling called for a common framework that is both transparent and testable and can be the subject of further calibration. Transparency can come from the Bayesian approach, which includes LRs as mechanisms for evidence assessment ("weighting") and aggregation ("interpretation"). LR is a quotient of a similarity factor, which supports the evidence that the query sample belongs to a given suspect (assuming that the null hypothesis is made by the prosecution P), and a typicality factor, such as Universal Background Model (UBM), which quantifies support for the alternative hypothesis made by the defense D that the query sample belongs to someone else.

B. Discriminative Methods

Discriminative methods support practical intelligence. Progressive processing, evidence accumulation, and fast decisions are the hallmarks for discriminative methods. Generally, it is not desirable to have expensive density estimation, marginalization, and synthesis characteristic of generative methods. There are additional philosophical and linguistic arguments that support the discriminative approach. Philosophically, it has to do with practical reasoning and epistemology, while recalling from Hume, that "all kinds of reasoning consist in nothing but a comparison and a discovery of those relations, either constant or inconstant, which two or more objects bear to each other," similar to non-accidental coincidences and sparse but discriminative codes for association.

Optimal and robust performance using model-free and non-parametric decision-based fusion is therefore the approach advanced by the present invention. Formally, it is known that pattern classification can be approached from at least two points of view. One view can be informative (also referred to as generative). Here, the classifier learns class densities (e.g., HMM). Another view can be discriminative. Here, the goal is learning class boundaries without regard to underlying class densities (e.g., logistic regression, neural networks, etc.). Overall, discriminative methods avoid estimating how data has been generated. Instead, discriminative methods focus on estimating the posteriors in a fashion similar to the use of LR.

The informative approach for 0/1 loss assigns some input x to the class k∈K for whom the class posterior probability P(y=k|x)

$$P(y=k|x)=P(x|y=k)P(y=k)/\Sigma_m^K P(x|y=m)P(y=m) \quad (1)$$

yields maximum. The MAP decision requires access to the log-likelihood $P_\theta(x, y)$. The optimal (hyper) parameters θ are learned using maximum likelihood (ML) and a decision boundary is then induced, which corresponds to a minimum distance classifier. The discriminative approach models directly the conditional log-likelihood or posteriors $P_\theta(y|x)$. The optimal parameters are estimated using ML leading to the discriminative function $$\lambda_k(x)=\log [P(y=k|x)/P(y=K|x)] \quad (2)$$

that is similar to the use of UBM for score normalization and LR definition. The comparison takes place between some specific class membership k and a generic distribution (over K) that describes everything known about the population at large. The discriminative approach was found to be more flexible and robust against informative/generative methods because fewer assumptions are made. One possible drawback that is mentioned for discriminative methods comes from ignoring the marginal distribution P(x), which is difficult to estimate anyway. The informative approach is biased when the distribution chosen is incorrect.

LR provides a straightforward means for discriminative methods using optimal hypothesis testing. Assume that the null "H0" and alternative "H1" hypotheses correspond to impostor i and genuine g subjects, respectively. The probability to reject the null hypothesis, known as the false accept rate (FAR) or type I error, describes the situation when impostors are authenticated by mistake as genuine subjects. The probability for correctly rejecting the null hypothesis (in favor of the alternative hypothesis) is known as the hit rate (HR). It defines the power of the test 1−β with β the type II error when the test fails to accept the alternative hypothesis when it is true. The Neyman-Pearson (NP) statistical test ψ(x) tests in an optimal fashion the null hypothesis against the alternative hypothesis with ψ(x)=1 when $f_g(x)/f_i(x)>\tau$, ψ(x)=0 when $f_g(x)/f_i(x)<\tau$ for some constant τ, and α=P(ψ(x)=1|H0). The Neyman Pearson lemma further says that for some fixed FAR=α one can select the threshold τ such that the ψ(x) test maximizes the HR and it is the most powerful test for the null hypothesis against the alternative hypothesis at the significance level α. Specific implementations for ψ(x) during cascade classification are possible, and they are driven by strangeness (transduction) and boosting.

IV. RECOGNITION-BY-PARTS

In general, image variability and correspondence are major challenges for object recognition. It can even be more challenging for face authentication. But, recognition-by-parts helps makes face authentication easier because it does not seek for explicit invariance. Instead, it handles variability using component-based configurations that are flexible enough to compensate for pose changes and limited occlusion and distortions.

Similar to neural Darwinism, parts in the present invention may emerge on one side as a result of competitive processes that make legitimate associations between appearance and their (non-accidental) coincidences.

Feed-forward (cortical) architectures are known to provide the wetware that supports such processes in an incremental fashion. Hierarchical and incremental in nature, the fields of views that define such architectures abstract parts at increasingly lower (coarser) resolutions leading in a progressive fashion to layered categorization. It is the typicality of the receptive fields, or equivalently their relative strangeness or surprise, that drive categorization to enable face authentication despite image variability.

This competition is typically driven by both strength of response and mutual information between local responses and (putative) class labels with the parts encoded using an exemplar-based representation rather than a singleton. This competition may lead to both flexibility and redundancy. An important aspect of this competition is the flexibility to match what is most conspicuous and redundant to enable substitution when parts or their patch ("instance") elements are missing or changed or corrupted.

The recognition-by-parts approach is model-free and non-parametric. Such phenomena address the concerns raised by Pinto et al. regarding the natural variability expected from the biometric input. These approaches are in contrast with current methods that are model-based and make extensive use of marginalization. One way for model selection to estimate the unknown density is using marginalization that averages over all possible models. The final model is then a weighted sum of all prediction models, with weights given by the evidence (or posterior probability) that each model is correct. Multidimensional integration, due to the large number of parameters involved, is challenging. Restrictive assumptions on the underlying densities may then be made.

Likelihood functions are also known to be used to match and authenticate gallery patches vis-à-vis the whole appearance of the probe image. Towards that end, a unifying approach is proposed here to estimate the likelihood functions involved. The methods considered involve modeling (A1) joint appearance, (A2) differential holistic appearance, and/or (A3) patch independence (naïve Bayes). The A1 variant compares favorably against both A2 and A3 particularly in the presence of a large pose mismatch (misalignment). The strict assumptions behind A1 are somehow relaxed for the case of misalignment to learn and model patch dependencies using log-normal rather than normal distributions. Recent extensions of the above approach using a data-driven extension where one models patches in terms of not only their appearance, but also their spatial deformation as the viewpoint varies were reported. The concerns raised earlier regarding the suitability of such specific model-based and parametric methods for unconstrained and general (biometric) data are valid here as well.

V. METHODOLOGY

It is known that current feed-forward architectures leave out the decision-making stage characteristic of face authentication. Hence, an ad-hoc implementation, using Support Vector Machines (SVM), is proposed for classification.

Contrary to the known methods, the present invention incorporates a unified recognition-by-parts approach that covers image representation, matching, and categorization using data fusion. The approach may be mediated throughout by local estimation and likelihood ratios characteristic of transduction. Competition may first select among image patches and then cluster the winners as parts. The parts may be combined using decision lists to perform layered categorization that includes detection and authentication. Fitness driven by proximity and typicality is generally the thread that supports the unified recognition-by-parts architecture. The methodology of the present invention implements, stagewise, the equivalent of filter and wrapper methods. The filter methods provide for feature selection. This aspect may be accomplished using visual contents and mutual (cohort) information. The wrapper methods choose among parts to implement layered (and cascade) categorization using sequential decision lists.

The wrapper methods can support progressive (incremental) representation and interpretation. Furthermore, the wrapper methods are characteristic of known latency and evidence accumulation concepts. Evidence accumulation may involve a steady progression in the way that visual information is processed and analyzed. It has been pointed out that this function comes from bandwidth requirements and the need for an early and fast impression, categorization or recognition of the input. Asynchronous spike propagation and rank order (rather than rate) coding are some of the means proposed to explain the speed with which "neurons in the monkey temporal lobe can respond selectively to the presence of a face."

The most strongly activated neurons or processing units fire first. Greater impact is assigned to the spikes with shortest latency to stimulus onset. The order and relative strength in which this takes place is the (temporal) code used for recognition. Order and relative strength come from the specific sequence of parts used as weak learners and assembled by boosting. The order of the corresponding temporal code and the relative strength come from the specific sequence of parts used as weak learners and can be assembled by boosting.

The terms "feature" and "parts" are interchangeable in meaning and are used throughout this disclosure.

Figure 7:
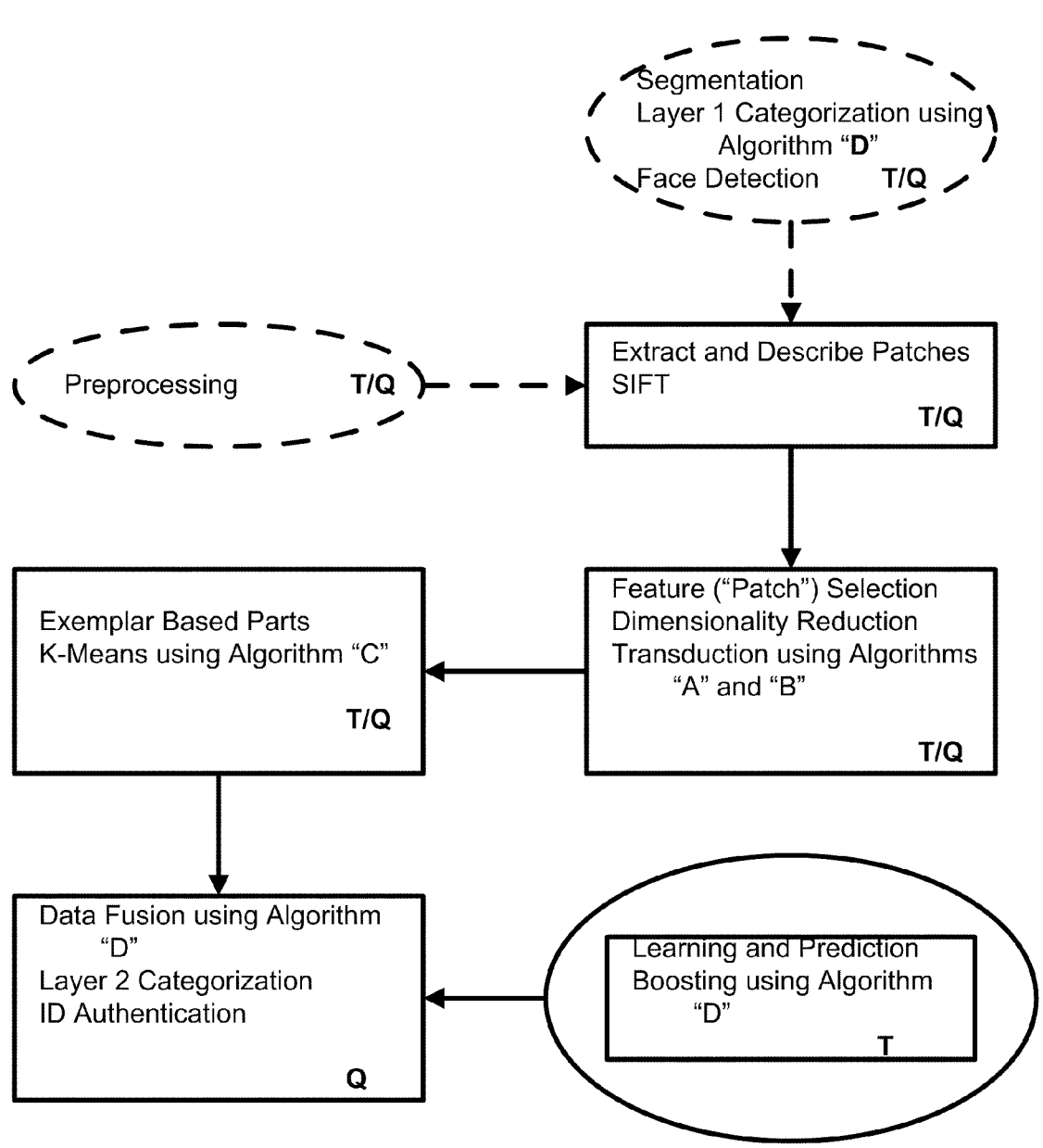
FIG. 7 is a flow diagram showing an example of a recognition-by-parts architecture.

Referring to FIG. 7, a formal recognition-by-parts architecture and its particular implementation can be seen. Generally, the starting point is optional (dashed oval) preprocessing that can handle sensory variability and help enhance image quality. The early stages of image encoding may be realized using SIFT filters whose encoding corresponds to 1st and 2nd order (spatial) statistics. The input for SIFT comes from an optional face detection stage or using some specific grid (e.g., golden ratio template) across an already cropped faces. Processing may proceed with (1) feature selection (Algorithm A) of image patches (similar to Markov blankets) using proximity and typicality, and (2) dimensionality reduction (Algorithm B). Patches may be clustered into (exemplar-based) parts using K-Means (Algorithm C). Hierarchical categorization can start with optional (dashed oval) Layer 1 categorization for (image) segmentation and face detection. Layer 2 categorization, always present, implements ID authentication to answer specific (test) queries (Q). Authentication may be driven by data fusion; it may be realized using boosting (Algorithm D). Weak learners ("parts") may be optimally combined during training (T) and build strong classifiers. Training (T) (including enrollment) and (testing) queries (Q) are complementary with the latter going through the same stages except the derivation of strong classifiers. Processing queries ("probes") may include matching using the strong classifiers trained using boosting.

VI. TRANSDUCTION

Transduction (transductive inference) is different from inductive inference. Inductive inference is a type of local inference ("estimation" or "classification") that moves from particular(s) to particular(s). Inductive inference uses empirical data to approximate a functional dependency (the inductive step—moves from particular to general) and then uses the dependency learned to evaluate the values of the function at points of interest (the deductive step—moves from general to particular).

In contrast, transduction directly estimates (using transduction) the values of the function (only) at the points of interest from the training data.

Transduction seeks to authenticate unknown faces in a fashion that is most consistent with the given identities of known but similar faces (from an enrolled gallery). The simplest mathematical realization for transductive inference is the method of k—nearest neighbors. The Cover-Hart theorem proves that asymptotically the one nearest neighbor (1-nn) is bounded above by twice the Bayes' minimum probability of error. Similar and complementary to transduction is semi-supervised learning (SSL).

Face recognition requires one to compare face images according to the way they are different from each other and to rank them accordingly. Scoring and ranking, or alternatively proximity and typicality, are realized using the strangeness and p-values. Transduction and Kolmogorov complexity are closely related, and facilitate consistent and robust labeling for recognition as described next. Let #(z) be the length of the binary string z and K(z) be its Kolmogorov complexity, which is the length of the smallest program (up to an additive constant) that a Universal Turing Machine (UTM) needs as input in order to output z. The randomness deficiency D(z) for string z is D(z)=#(z)−K(z) with D(z) a measure of how random the binary string z is. The larger the randomness deficiency is the more regular and more probable the string z is. Kolmogorov complexity and randomness using MDL (minimum description length) are closely related. Transduction chooses from all the possible labeling for test data the one that yields the largest randomness deficiency (i.e., the most probable labeling).

Figure 8:
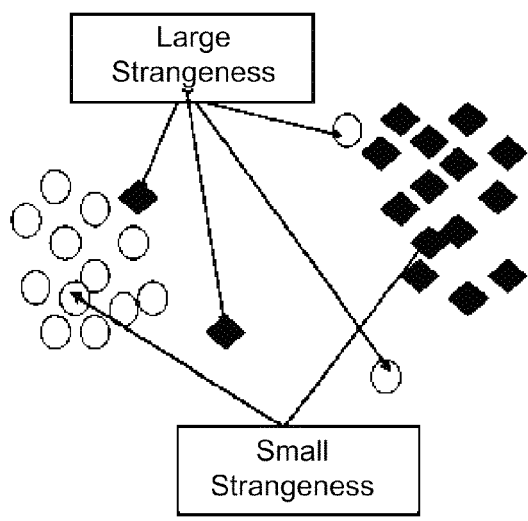
FIG. 8 shows an example of strangeness.
Figure 8:
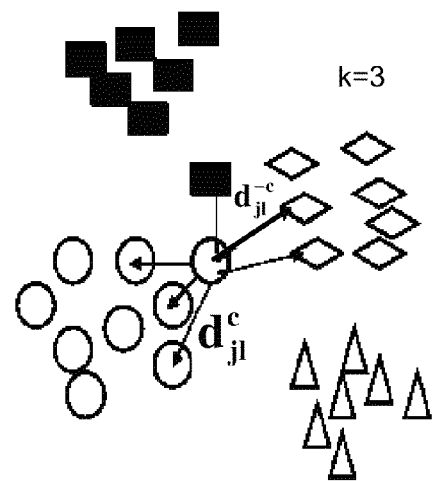
Figure 8:
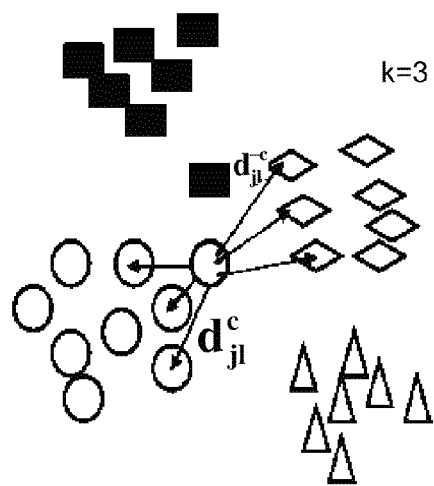

Randomness deficiency is not computable. Instead, randomness deficiency needs to be approximated using a slightly modified Martin-L of test for randomness. The values taken by such randomness tests (with respect to some strangeness or typicality measure) are referred to as p-values. The strangeness measures the uncertainty or equivalently the lack of similarity ("proximity") for a data point or face (part) with respect to its true or putative (assumed) identity label and the labels for all the other faces, as shown in FIG. 8(a). The strangeness measure $\alpha_i$ is the ratio of the sum of the k nearest neighbor (k-nn) distances d from the same class y divided by the sum of the k nearest neighbor (k-nn) distances from all the other class labels (¬y), as shown in FIG. 8(b) and Equation 3:

$$\alpha_i = \frac{\sum_{j=1}^{k} d_{ij}^{y}}{\sum_{j=1}^{k} d_{ij}^{\neg y}}. \tag{3}$$

The strangeness of an exemplar increases when the distances from the exemplars of the same class become larger and/or when the distances from the other classes become smaller. The smaller the strangeness is, the larger its randomness deficiency and more probable its (putative) label is. Each new test exemplar e with putative label y (and strangeness $\alpha_{new}^{y}$) requires to compute again, if necessary, the strangeness for all the training exemplars when the identity of their k-nn exemplars changes due to the location of (the just inserted unlabeled exemplar) e. Alternatively the strangeness can be defined, as seen in FIG. 8(c) and Equation 4, in a fashion similar to cohort models, as the (likelihood) ratio of the sum of the k-nn distances from the same class to the sum of the k-nn distances from the nearest class. This definition is the definition used throughout the present invention for the strangeness:

$$\alpha_j = \frac{\sum_{l=1}^{k} d_{jl}^c}{\min_{c, n \neq c} \sum_{l=1}^{k} d_{jl}^n}. \quad (4)$$

Empirically, the strangeness, classification margin, sample and hypothesis margin, a posteriori probabilities, and odds should all be related via a monotonically nondecreasing function with a small strangeness amounting to a large margin. Additional empirical relations may be found linking the strangeness and the Bayesian approach vis-à-vis the likelihood ratio when using the logit of the probability (i.e., the logarithm of the odds, logit (p)=log(p/(1−p))), the difference between the logits of two probabilities (i.e., the logarithm of the odds ratio, log(p/(1−p)/q/(1−q))=logit (p)−logit (q) (see also logistic regression and the Kullback-Leibler (KL) divergence)). The logit function is the inverse of the "sigmoid" or "logistic" function. Another relevant observation that supports the use of the strangeness comes from the fact that unbiased learning of Bayes classifiers is impractical due the large number of parameters that have to be estimated. The alternative to the unbiased Bayes classifier is then logistic regression, which implements the equivalent of a discriminative classifier.

Logistic regression is a form of the sigmoid function that directly estimates the parameters of P(y|x) and learns mappings f: x→y or P(y|x), e.g., P{y=1|x} for the case when y is Boolean. Logistic regression suggests thus likelihood ratios, e.g., label y=1 if P{y=1|x}/P{y=0|x}>1. Finally, logistic regression can be approximated by SVM. Using greedy optimization, AdaBoost minimizes some functional whose minimum defines logistic regression, and an ensemble of SVM is functionally similar to AdaBoost. The strangeness is thus quite powerful as it provides alternative but simpler realizations for a wide range of well known discriminative methods for classification. The strangeness and the likelihood ratio are thus intimately related to discriminative methods.

The p-values defined next compare the strangeness values relative to each other and vis-à-vis each putative label available. The p-values are used to determine the typicality for the given probe ("query"). They provide detailed information for the putative label assignments made. Such information includes credibility and confidence (see below) in the putative label assignments made and can be readily used for data fusion tasks. The p-values bear resemblance to their counterparts from statistics but are not the same. They are determined according to the relative rankings of putative authentications against each one of the identity classes enrolled in the gallery using the strangeness. The standard p-value construction shown in Equation 5 below, where l is the cardinality of the training set T, constitutes a valid randomness (deficiency) test approximation for some transductive (putative label y) hypothesis:

$$p_y(e) = \frac{\#(i : \alpha_i \geq \alpha_{new}^y)}{l+1}. \quad (5)$$

The interpretation for p-values is similar to statistical testing for likelihood ratios. It assesses the extent to which the biometric data supports or discredits the null hypothesis (for some specific authentication). When the null hypothesis is rejected for each identity class known, one declares that the test image lacks mates in the gallery and the identity query is answered with "none of the above." Such a rejection is characteristic of open set recognition. Similar to semi-supervised learning, changing the class assignments (characteristic of impostor behavior) provides transduction with an inductive bias that helps to determine the rejection threshold required to make an authentication or to decline making one. Towards that end one relabels the training exemplars, one at a time, with all the putative labels available, except the one originally assigned to it. The PSR (peak-to-side) ratio, PSR=(pmax−pmin)/pstdev, describes the characteristics of the resulting p-value distribution and determines, using cross validation, the [a priori] threshold used to identify impostors. The PSR values found for impostors are low because impostors do not mate and their relative strangeness is high (and p-value low). Impostors are deemed as outliers and are thus rejected. A similar approach is used to train strong classifiers for face authentication during boosting. The realization of our recognition-by-parts architecture, referring back to FIG. 7, is also described. This description includes patch image representations, feature ("patch") selection (including dimensionality reduction), exemplar-based part derivation using clustering of patches, and matching, classification, and data fusion for decision-making. Additionally, Layer 2 categorization for face ID authentication using frontal faces (already detected) from FRGC is described. Similar processing takes place for Layer 1 categorization for face detection and location including the discrimination of the face from clutter and other objects that populate the image. Experimental results may be obtained for both Layer 1 and Layer 2 categorization. The last three processing stages are discriminative in nature. They are driven by transduction using proximity ("strangeness") and typicality ("p-values") that emulate the use of likelihood ratios.

VII. PATCH IMAGE REPRESENTATIONS

Figure 9:
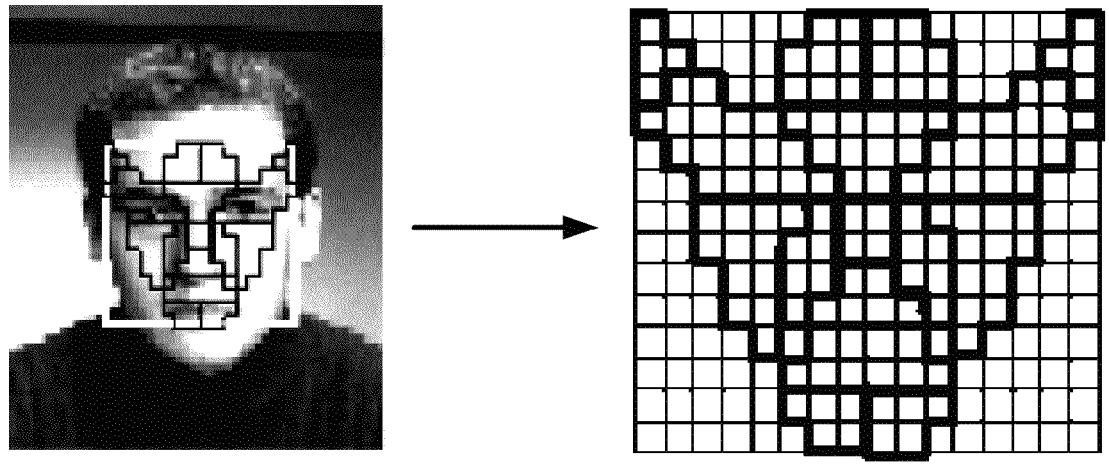
FIG. 9 shows an example of a golden ratio face template.

The face representation used for recognition-by-parts spans a multi-resolution grid that captures partial information at different scales. This grid conforms to feed-forward architectures and accommodates different surveillance scenarios, including, but not limited to, human identification from distance (HID). Referring to FIG. 9, the golden ratio template may be used as the geometrical/topological framework where candidates for local face patches are found and aggregated. The template provides a rough spatial map for the facial features ("landmarks"). Instead of computing the ratio of the average gray level values from different (template) regions to represent the face as known in the art, the present invention makes each region center serve as the feature point center where patches at different scales and bandwidth channels are extracted.

The specifics surrounding the extraction of patches are straightforward. Given the box ("mask") surrounding the face and the location for the eyes, the center $o_i$ and minimal width/height $r_i$ of each region in the face image may be determined by their corresponding size in the golden ratio template. They then become the center of the feature ("patch") that are to be extracted. They also become the initial scale. To encode the local and global information of the face, multiple face components may be extracted at different scales for each center position. The k-th component of region i has the scale $r_{ik} = s^{k-1} r_i$ with $s = \sqrt{2}$.

Figure 10:
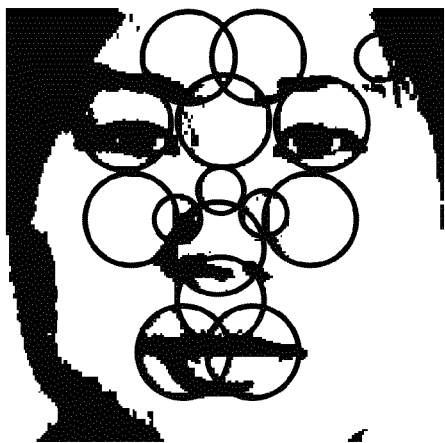
FIG. 10 shows an example of first and second order image patches.
Figure 10:
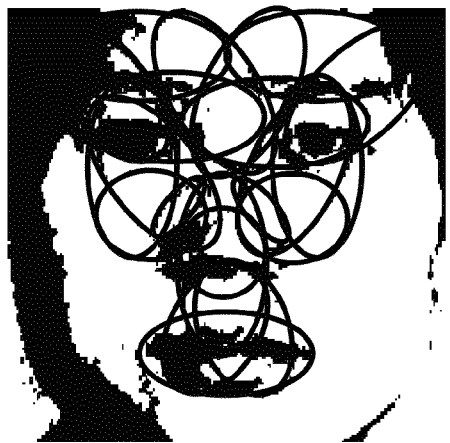

A Gaussian pyramid may be built by blurring the original image. The same number of patches are extracted at each level of the pyramid and all of them encode 1st order statistics. Given that the golden ratio template may have 16 regions, and given the scale level $N_s$ and the blurring level $N_b$, there may be $16N_sN_b$ 1st local patches extracted from each face image. Second local patches may also be extracted. The motivation for the 2nd order patches comes from the importance of suspicious coincidences, where "two candidate feature[s] A and B should be encoded together if the join appearance probability P(A, B) is much greater than P(A)P(B)." The 2nd order patches may be extracted from two neighboring local regions. The size of each patch may be represented by an ellipse with center x and parameters a and b. Given two neighborhood regions i and j with scales $r_{ik}$, $r_{jk}$ and centers $x_i$ and $x_j$, the 2nd order local patch may be extracted at center $x=(x_i+x_j)/2$, where $a=(\|x_i-x_j\|+(r_{ik}+r_{jk}))/2$ and $b=\max(r_{ik}, r_{jk})$. There may be $27N_sN_b$ second order local patches to extract. The face components may be defined across the eyes, nose, mouth, eye and nose, nose and mouth, and the like. FIGS. 10(a) and 10(b) show the 1st and 2nd order local patches at their initial scale, respectively.

Next, a descriptor for each local patch that is highly distinctive, yet invariant to image variability (e.g., illumination and deformations, such as facial expressions), can be computed. The SIFT descriptor, which satisfies such requirements, may be chosen to depict the local patches. SIFT can provide robustness against both localization errors and geometric distortions. Local gradients may be computed. The descriptor may include corresponding local orientation histograms (with eight bin resolution) for each element of a 4×4 grid overlaid over a 16×16 neighborhood of the point. Such orientation may yield a 128-dimensional feature vector which is normalized to unit length to reduce the sensitivity to image contrast and brightness changes during the testing stage. Each face may thus be represented by $43N_sN_b$ (1st and 2nd order) patches represented using SIFT.

VIII. FEATURE SELECTION AND DIMENSIONALITY REDUCTION

Patch ("feature") selection and dimensionality ("variable") reduction constitute the first processing stage. The strangeness implements the interface between the face representation and authentication. It combines the merits of filter and wrapper methods for patch selection and labeling using boosting, respectively. Since background features are distributed uniformly, they are relatively strange. They may be iteratively discarded as irrelevant using iterative backward elimination that approximates Markov blanket filtering. The strangeness-based feature ("patch") selection algorithm A works as follows:

Algorithm A
1. Given local features $\{g_i\}$ in $R^d$ and class labels.
2. Compute the strangeness of each feature $g_i$ using Equation 4.
3. Initialize the strangeness threshold $\gamma$.
4. for t=1, 2, . . . , T
   Select the features $\{g_m\}$ with strangeness $\alpha_m \geq \gamma$.
   Discard $\{g_m\}$ and update the strangeness of remaining features.
   If the strangeness for all remaining features is less than $\gamma$ terminate
end for Algorithm A implements weak supervised learning when the label for the whole image is known but not its location. In the case of face detection (i.e., face (foreground) vs. background), one may find for each patch the closest patches from other images that carry the same class label. If there is only one class of objects or patches from additional background only images are used to compute the strangeness. The closest patches tend to belong to objects (i.e., faces, or belong to the background). If the patch can be detected repeatedly, most of its nearest neighbors come from the same object. Otherwise, the patch is not robust to view point, illumination or distortion, and will be discarded as strange and irrelevant.

Variable selection or equivalently dimensionality reduction is complementary to feature selection. It seeks the most discriminative subset of SIFT components, using again the strangeness. Variable selection searches for input variables from some set X that are consistent for a sample and its similarly labeled k—nearest neighbors to ensure that the mutual information between the components chosen and the (face) class label tends to be high. The fitness used for variable selection is driven by strangeness. As small strangeness means large margin for generalization purposes, one seeks subsets of input variables that display large margin. The iterative algorithm B used for variable selection using strangeness is very similar to the standard RELIEF algorithm in its implementation. The optimal subset of input variables selected may include the top ranked variables with the rankings according to iteratively updated weights $\omega$. A goal is to minimize the fitness evaluation function $\Phi(\omega)=\Sigma\alpha_j^\omega$ for $x_j\in X$ with $\alpha$ standing for the strangeness and n the dimension of the SIFT vector.

Algorithm B
1. Initialize $\omega=1$.
2. for t=1, 2, . . . , T
   Pick randomly any sample ("patch" $x_t$ from training set.
   Calculate the strangeness $\alpha_t$ of $x_t$ using a weighted $\omega$ distance between nearest neighbors in Equation 4.
   Calculate the gradient $(\Lambda\Phi(\omega))$.
   Update $\omega=\omega-\rho\Lambda$.
   end for
3. The selected feature set is $\{i|\omega_i \geq \tau\}$ where $\tau$ is a threshold determined through validation.

IX. EXEMPLAR-BASED PARTS DERIVATION

The parts are the input used for matching and authentication. The parts are clusters of local patches and may be modeled using an exemplar-based representation. This modeling is similar to the way objects in inferotemporal (IT) cortex are represented using a variety of combinations of active and inactive cortical column ["patches"] for individual features ["parts"]. The exemplar-based representation facilitates flexibility during authentication. Matching has access to different exemplars that become available according to the image acquisition conditions.

The patches selected during the previous stage may be aggregated into P parts using K—means (unsupervised) clustering (Algorithm C). Relative locations across the whole image during face detection and relative locations across the golden ratio template ("grid") during matching for authentication constrain clustering. Clustering creates an abstract but hierarchical vocabulary that can be shared among faces (and objects) and is suitable for layered categorization starting with detecting faces (foreground) from background and proceeding with authentication. Features may be extracted, described, selected, and have their dimensionality reduced, in a layered wise [hierarchical] fashion as categorization goes from coarse to fine. The features with close-by locations and similar scale may be grouped as parts and provide the pool of weak learners that are to be used later on by boosting for training and answering authentication queries. The face may be represented by $43N_s$ parts, each of which has up to $N_b$ feature "patch" instances extracted for different bandwidth channels. Symmetry considerations can reduce the number of parts.

Figure 11:
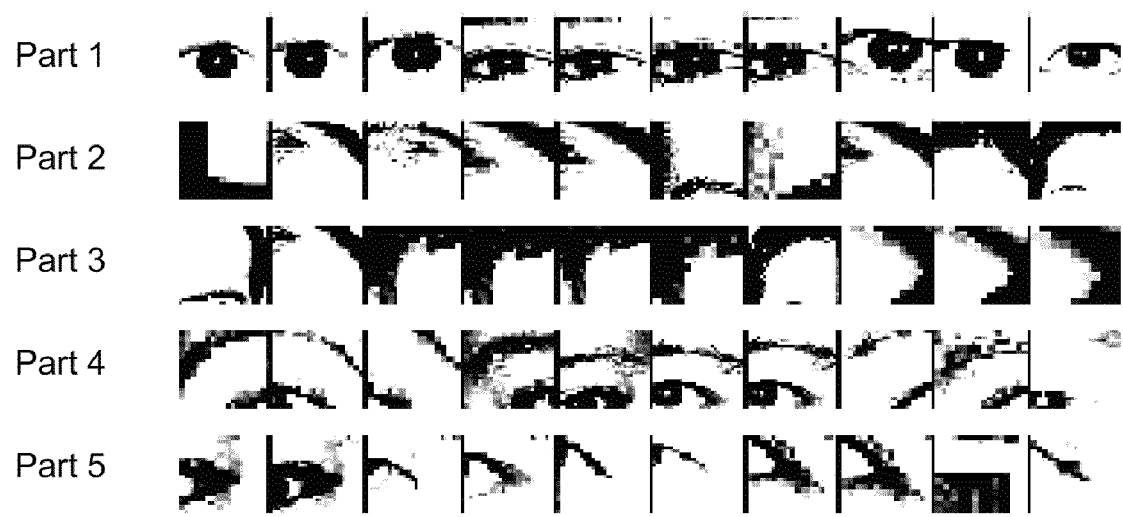
FIG. 11 shows an example of face parts.

Additional motivation for an exemplar-based part representation goes as follows. After feature selection each training image may be represented by the selected feature set. AdaBoost algorithm can be applied on the selected "simple" feature set directly using the strangeness for each selected feature as the base (weak) classifier. As the feature "patch" instance selection, Algorithm A only discards irrelevant features redundant features survive. Several features may thus be extracted from close-by locations. If each feature is considered as a weak classifier the final strong classifier will be over-fitting and will display low generalization ability. Take as an example the eye, as seen in FIG. 11, which is an important feature used to distinguish one face from another one. If the final strong classifier were to include several eye weak learners, for whom the coefficients are large, there is a large probability of misclassification if some of the eye features are not detected.

X. BOOSTING

Boosting using open set cross-validation learns strong classifiers. The weak learners ("parts") compete to build up strong classifiers. The relative (confidence) weighting and order (ranking) for the weak learners is determined according to their relative strangeness or distinctiveness (i.e., their ability to discriminate). Learning and prediction are model free and non-parametric. Similar to evidence accumulation and cascade learning, boosting involves a steady progression in the way that visual information is processed and interpreted.

The basic assumption behind boosting is that "weak" learners can be combined to learn any target concept with probability $1-\eta$. Usually built around simple features, weak learners learn to classify at better than chance (with probability $\frac{1}{2}+\eta$ for $\eta>0$). Towards that end AdaBoost works by adaptively and iteratively re-sampling the data to focus learning on samples that the previous weak (learner) classifier could not master, with the relative weights for the misclassified samples increased after each iteration. Thus, AdaBoost involves choosing T effective features $h_t$ to serve as weak (learners) classifiers and using them to construct the separating hyper-planes. The mixture of experts or final boosted (stump) strong classifier H for any query Q is $$H(Q) = \sum_{t=1}^{T} \beta_t h_t(Q) > \frac{1}{2} \sum_{t=1}^{T} \beta_t \quad (6a)$$

with $\beta_t$ the reliability or strength of the weak learner t. The constant $\frac{1}{2}$ appears because the boundary is located midpoint between 0 and 1. If the negative and positive examples are labeled $-1$ and $+1$, the strong classifier using the sign function becomes $$H(Q) = \text{sign} \sum_{t=1}^{T} \beta_t h_t(Q). \quad (6b)$$

The goal for AdaBoost is margin optimization with the margin viewed as a measure of confidence or predictive ability. The weights taken by the data samples are related to their margin and explain the AdaBoost's generalization ability. AdaBoost minimizes (using greedy optimization) some risk functional whose minimum defines logistic regression. AdaBoost converges to the posterior distribution of the label y conditioned on Q with the strong but greedy classifier H becoming in the limit the log-likelihood ratio test. The same margin can also be induced using the strangeness; this approach is the approach that the present invention takes.

The specific implementation for learning and prediction is described next. Model free and non-parametric weak learners ("parts") compete to build up strong classifiers. The relative (confidence) weighting and order (ranking) for the weak learners may be determined according to their strangeness. The strangeness based multi-class weak learner selected at each iteration corresponds to the most discriminative part. The confidence and thresholds required for the strangeness based weak learners may be found using cross-validation in a fashion similar to that used for open set recognition. Standard AdaBoost may be mapped onto the present invention's boosting algorithm D using strangeness and parts as weak learners. The algorithm iterates for $t=1, \ldots, T$ or until some performance criteria is met. The multiclass extensions AdaBoost.M1 and AdaBoost.M2 are discussed below.

(AdaBoost Cross-Validation) Algorithm D
Input: Training gallery $\{G_i^c\}_{i=1}^{P}, c=1, \ldots, C$, where $\{G_i^c\}$ is the feature ("patch") instance set for the ith part of class c; validation images $\{V_m, m=1, \ldots, l, MC\}$ with M examples from each class and corresponding features $\{g(V_m)_i\}$.
Metric: Let d ( . . . ) be the distance between two feature descriptors.
Strangeness computation: For each part i of class c, find the nearest feature $\hat{g}(V_m)_i$ between $g(V_m)_i$ and $\{G_i^c\}$. The strangeness of $\hat{g}(v_m)_i$ is computed using Equation 4 with putative class label c for $V_m$. The part i for class c yields MC strangeness $\{\alpha_m^c\}_{m=1}^{MC}$, M of which belong to positive examples and $M(C-1)$ to negative examples.
Ranking and sorting strangeness: For each part i of class c, let $\pi(1), \ldots, \pi(MC)$ be the permutation for whom $$\alpha_{\pi(1)}^c \leq \alpha_{\pi(2)}^c | \leq \ldots \leq \alpha_{\pi(MC)}^c$$

Threshold selection for weak learner: For each part i of class c find the best index position s that yields the maximum classification (see FIG. 12)

$$\text{rate}(i) = \max_s \sum_{n=1}^{s} \omega_{\pi(n)} 1(\alpha_{\pi(n)})$$

with $1(\alpha_{\pi(n)})$ is 1 if $\alpha_{\pi(n)}$ comes from positive examples and $-1$ otherwise; and $\omega_{\pi(n)}$ are the relative weights $\beta_i$ (see Equation 6 for basic Adaboost) for each part. The threshold for the weak ("stump") learner i is $$\theta_i = \frac{1}{2}[\alpha_{\pi(s)} + \alpha_{\pi(s=1)}]$$

Select the best weak learner: The best part chosen on this iteration t is $\hat{i}$ for whom $\hat{i}=\max$ rate (i). The sample distribution $D_t$ for the next iteration is updated according to the error $e_t$ sustained by the winner, with the weight of the weak learner set according to the error rate $e_t=1-\text{rate}(\hat{i})$.

Figure 12:
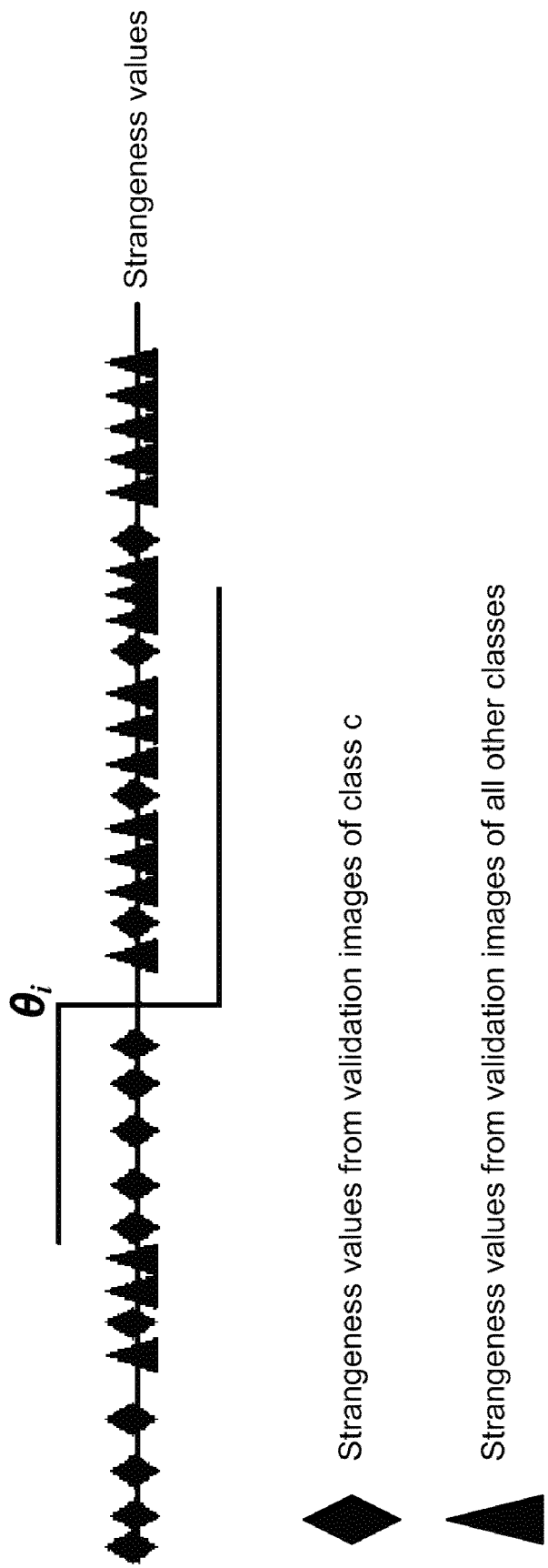
FIG. 12 shows an example of learning weak learners as stump functions.

The informal explanation for Algorithm D goes as follows. Each class may be represented by parts in terms of their exemplar-based patches. The coefficients and thresholds for the weak learners, including the thresholds needed for rejection and open set recognition, may be learned using validation images, which are described in terms of parts (and their patches) similar to those found during enrollment. The best feature correspondence for each part is sought between a validation and any training face image over all the patches ("exemplars") defining that part. Such aspect of the present invention makes the recognition robust because it allows for patches originating from different gallery images to accrue evidence for the same validation image. The strangeness for each part may be computed for the same validation image under all its putative class labels c (c=1, ..., C). Assuming M validation images from each class, one can derive M positive strangeness values for each class c, and M(C−1) negative strangeness values. The positive and negative strangeness values correspond to the case when the putative label of the validation and training image are the same or not, respectively. The strangeness values are ranked for all the parts available, and the best weak learner is the one that maximizes the recognition rate over the whole set of validation images V for some part/and threshold $\theta(\hat{i})$, as shown in FIG. 12. The criterion for choosing the threshold is to minimize the classification error through the use of the indicator function $1(\alpha_{\pi(n)})$. Classification errors may be recorded if the accrued strangeness is less than the threshold for negative examples or greater than the threshold for positive examples. A part may be chosen as a weak learner on each iteration using the above procedure. Upon completion, boosting yields the strong classifier H(Q), which is a collection of the best discriminative parts playing the role of weak learners.

Prediction for queries Q is similar in approach to training and validation (see FIG. 7). Given some query (test probe) Q, one may extract patches and optimally represent them using the SIFT features chosen earlier. Patches aggregate and form parts. Resolving the query Q is a process that iterates over a gallery that includes C classes. For each class c∈C and part i∈c one has to find the closest k patches (to compute the strangeness). The search loop may iterate over all the enrolled face images from both c and ¬c. The weak "stump" learner $h_i(Q)$ outputs 1 when the part is recognized and −1 otherwise. The part may be recognized if the strangeness $\alpha_i$ for the weak learner is less than the threshold learned, i.e., $\alpha_i \leq \lambda_i$. Evidence can be incrementally accrued as one finds and matches the parts for query Q with those for the putative class label c and determines the overall score for the strong classifier H(Q). The ID for the face is the label c that maximizes H(Q).

The multi-class extensions for AdaBoost 98 are Ada-Boost.M1 and .M2 with the latter being used here to learn strong classifiers. The focus is now on both samples difficult to recognize and labels hard to discriminate. The use of features (or here, parts) as weak learners is justified by their apparent simplicity. The drawback for AdaBoost.M1 comes from its expectation that the performance for the weak learners selected is better than chance. When the number of classes is k>2, the condition on error is, however, hard to be met in practice. The expected error for random guessing is 1−1/k; for k=2 the weak learners need to be just slightly better than chance. AdaBoost.M2 addresses this problem by allowing the weak learner to generate, instead, a set of plausible labels together with their plausibility (not probability), i.e., $[0, 1]^k$. Towards that end, AdaBoost.M2 introduces a pseudo-loss et for hypotheses $h_t$ such that for a given sampling distribution $D_t$, one seeks $h_t: X \times Y \to [0, 1]$ that is better than chance. It has been said that "pseudo-loss is computed with respect to a distribution over the set of all pairs of examples and incorrect labels." Furthermore, "by manipulating this distribution, the boosting algorithm can focus the weak learner not only on hard-to-classify examples, but more specifically, on the incorrect labels y that are hardest to discriminate."

The use of Neyman-Pearson criterion, complementary to AdaBoost.M2 training, can meet pre-specified hit and false alarm rates during weak learner selection, which is similar to cascade learning. Setting the threshold $\theta_i$ for the weak ("stump") learner is driven by the Neyman-Pearson criterion with classification errors accrued accordingly. The level of significance $\alpha$ determines the scope for the null hypothesis. Different but specific alternatives can be used to minimize Type II error or equivalently to maximize the power (1−β) of the strong classifier. The present invention's boosting approach (see Algorithm D) is competitive in nature. It considers all the enrolled images and seeks the one that maximizes H(Q). This embodiment is feasible because recognition takes place at the level of parts using flexible matching between patch exemplars. This aspect is characteristic of layered and structured categorization and is quite different from cascade learning where a very large number of similar but simple integral features are used for recognition. During cascade learning each weak learner ("classifier") has to achieve some (minimum acceptable) hit rate and (maximum acceptable) false alarm rate. Each stage, and there are many of them according to the number of feature used, has to filter out all the images that fail the test.

XI. EXPERIMENTS

Figure 13:
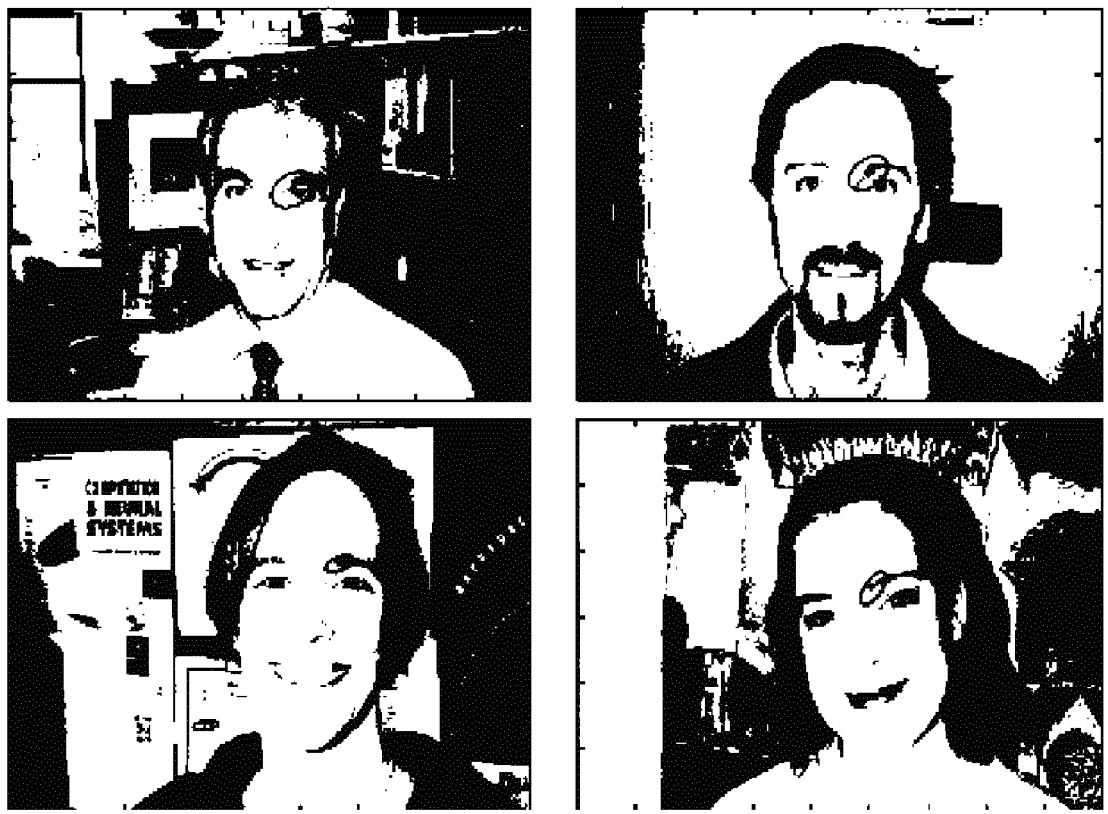
FIG. 13 shows an example of the best feature for face detection.

The experimental results reported here illustrate the feasibility and utility of model-free and non-parametric recognition-by-parts using boosting and transduction. First experimental results EX1 show that the present invention's boosting realization of face detection is confirmed by psychophysical findings. Among these findings is Result 5, where of the different facial features, eyebrows were indeed found, using the present invention, as most important for face detection (Layer 1 categorization: face vs. background using Caltech101 database) using boosting and transduction (see FIG. 13). The best weak learner corresponds to the part that yields the largest coefficient when boosting starts. The explanation for this finding is straightforward. The eyebrows are highly discriminative due to their emotive contents, stability, location above a convexity that makes them less susceptible to shadow, illumination changes, and displacement due to movement.

The next experiment EXP2 reports the performance for the present invention's model-free and nonparametric face detection ("recognition-by-parts") approach. Faces compete for detection and categorization (e.g., faces against motorbikes, airplanes, and cars). The detection ROC using the Caltech101 database for γ=1 (see Algorithm A for feature selection), P=30 (see Algorithm C for part derivation), and k=5 (number of k-nearest neighbors for computing the strangeness) yields an equal error rate (EER) of 94.4%. EER is the point on the ROC curve where the false positive rate (FAR) is equal to the false negative rate (FNR) or equivalently to 1—the detection ("hit") rate. Layer 1 categorization for face detection is brought to completion when faces are also distinguished from all the other object categories. The detection rate obtained was 93.4%. The next experiment EXP3 checks how face detection performance varies according to the number of clusters "parts" P used. The results obtained show that our approach is very stable when the number of clusters "parts" P is in the range [25, 50]. When P is small there is not much evidence for data fusion (of parts) and the strong classifier lacks in discriminating power. This aspect is consistent with the theory behind boosting. When the number of parts P is too large, similar features show in multiple clusters. Redundant information is shared among competing "weak" hypotheses and the strong classifier shows overfitting. The same experiment EXP3 also showed that the present invention's approach compares favorably against RELIEF on both performance and the number and stability of the features selected. Another finding related to the bandwidth channel is that at each location of the face median size regions are more important than small and large size regions.

Biometric experiments EXP4 characteristic of Layer 2 categorization were performed to validate the present invention's approach for face ID authentication. The data used includes frontal faces collected at the University of Notre Dame (UND) during 2002-2003, and now part of the FRGC face image database. The experiments are functionally similar to those using multiple samples for face recognition. The face images were acquired under varying illumination and/or with varying facial expressions. There is also temporal variation as the face images were acquired during different sessions over a one year period. The present invention sampled 200 subjects from the data base; for each one of them there are 48 images of which 16 were acquired in an uncontrolled environment. Local patches are extracted and the corresponding SIFT descriptors are computed using $N_s=5$ and $N_b=4$.

Each face may be represented by $P=43N_s=215$ parts with $N_b+1=5$ feature instances. If the symmetry of the frontal face is considered, there can be $P=26N_s=130$ parts for each face, each of which has a different number of feature instances. For each subject, 12 images for training, another 12 images for validation, and the remaining 24 images may be randomly selected for testing. The Euclidian distance is used to compute the strangeness. The top-1 rank identification rates using 1st order patches and strangeness based boosting were 97.5% and 97.9% without and with symmetry, respectively. The corresponding rates using both 1st and 2nd order patches were 98.1% and 98.9%, respectively.

The comparative performance of the present invention's strangeness (transduction) based boosting recognition-by-parts method (see EXP4) is evaluated by the next experiment EXP5. The present invention's method is compared against a voting recognition scheme based on the Transduction Confidence Machine (TCM). Authentication may be determined for the voting scheme according to the number of parts (posed by query Q) matched by the gallery of enrolled faces. Each part may be matched according to its putative class label c that yields the largest p-value. The class membership for the face may be predicted by class voting (i.e., the putative class label c that enjoys the largest number of matched parts). Strangeness-based boosting may outperform the voting approach, 97.5% and 98.1% vs. 87.8% and 90.3% using 1st and 2nd order patches (without symmetry) and 97.8% and 98.9% vs. 88.1% and 89.2% using 1st and 2nd order patches (with symmetry). The explanation for the comparative advantage shown by the present invention's method comes from its unique use of validation (see AdaBoost Algorithm D) with competition between the parts playing the crucial role. The parts are not merely counted but rather their significance varies according to the categorization task accomplished.

Figure 14:
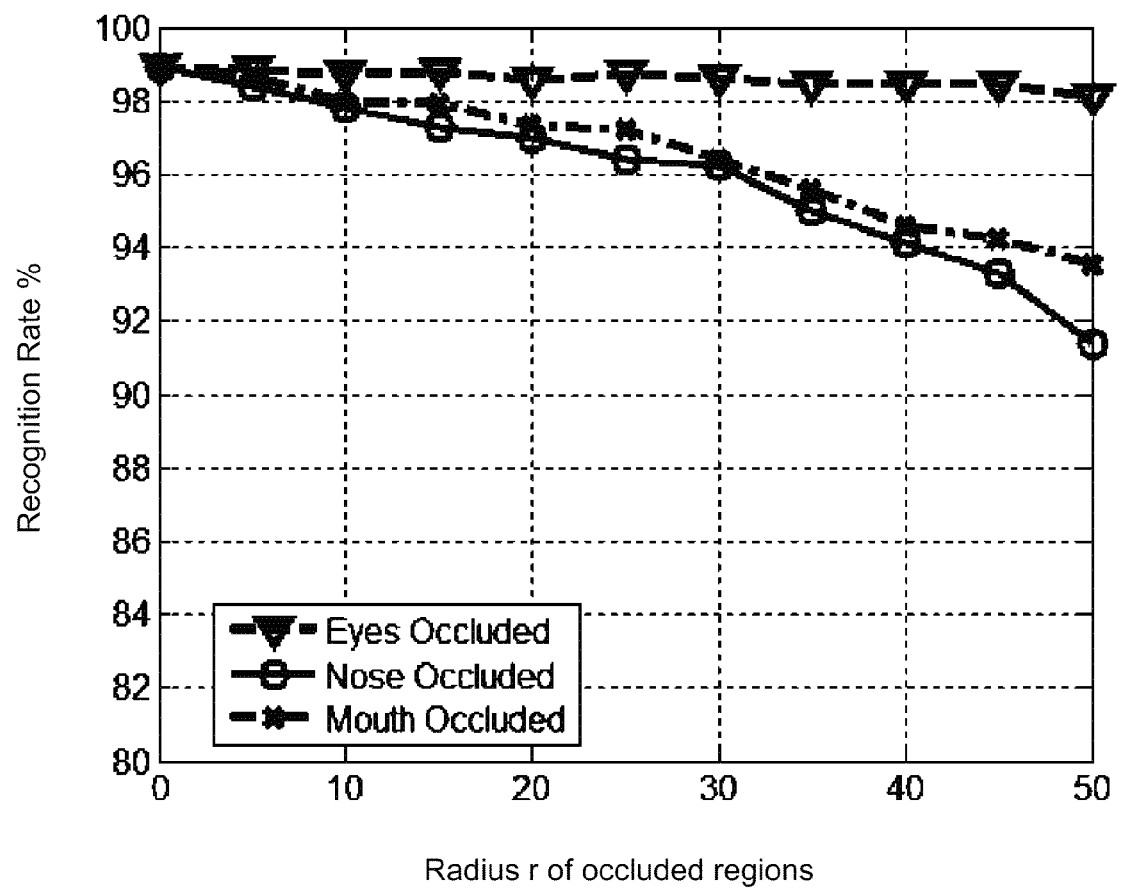
FIG. 14 shows an example of recognition rates with respect to r when eye, nose, or mouth is occluded.

To further evaluate the performance of boosting using transduction for face ID authentication, under adverse image capture conditions the next experiment EXP6 considers tests images modified to simulate occlusion. A circle region with radius r may be randomly chosen across the face image, the content of which is either set to zero or filled with random pixel values in [0, 255]. On the average the recognition rate decreases when the radius of occluded region increases but it does not drop too much. The occluded regions may be randomly chosen and the performance observed should be very stable when the occluded regions are not too large. The particular experiment reported next EXP7 considers the case when the occluded regions are fixed (e.g., eyes, nose, and mouth). FIG. 14 shows the recognition rates with respect to radius r when one eye, nose or mouth is occluded and symmetry is used. The occlusion of nose affects the performance more than the mouth and eyes. This effect is consistent with the relative distribution found for the face parts' coefficients during boosting training. It is also consistent with known findings regarding the importance of the nose for biometric authentication using asymmetric faces. Note the importance of the nose for Layer 2 categorization ("identification") vs. eyebrows importance for Layer 1 categorization ("detection") (see EXP1).

XII. CONCLUSIONS AND FUTURE RESEARCH

The present invention describes a novel and unified recognition-by-parts architecture suitable for reliable and robust face recognition. The architecture proposed is model free and nonparametric. At the conceptual level it links forensics and biometrics, while at the implementation level it links the Bayesian framework and statistical learning theory (SLT). Layered categorization starts with face detection using implicit segmentation rather than explicit segmentation. And, it continues with face authentication. It proceeds with face authentication that involves feature selection of local patch instances including dimensionality reduction, exemplar-based clustering of patches into parts, and data fusion for matching using boosting driven by parts that play the role of weak-learners. Face authentication shares the same implementation with face detection. Driven by transduction, the implementation employs proximity and typicality (ranking) realized using strangeness and p-values, respectively. The feasibility and robustness of the proposed architecture may be illustrated using FRGC data.

It has been argued that "rather than relying exclusively on traditional edge-based image representations, [e.g., SIFT,] it may be useful to also employ region-based strategies that can compare noncontiguous image regions." Furthermore, it has been shown that "under certain circumstances, comparisons [using dissociated dipole operators] between spatially disjoint image regions are, on average, more valuable for recognition than features that measure local contrast." This argument leads to the observation that the recognition-by-parts architecture should learn "optimal" sets of regions' comparisons for recognizing faces across varying pose and illumination. The choices made on such combinations (during the feature selection stage) amount to "rewiring" operators that connect among local lower level operators.

Rewiring corresponds to an additional processing and competitive stage for the feedforward recognition-by-parts architecture. As a result, the repertoire of feature is likely to range over local, global, and non-local (disjoint) operators ("filters"). Ordinal codes, rather than absolute codes, tend to be feasible to gain invariance to small changes in inter-region contrast. The parts may be clusters described as exemplar-based collections of representative (local or disjoint rewired) patches. Disjoint and "rewired" patches may contain more diagnostic information and are expected to perform best for expression, self occlusion, and varying angle and pose variability. Small-scale local SIFT features may still be most suitable for biometric authentication under varying illumination. This aspect is consistent with the optimality of gradient-based features for such tasks. The multi-feature and rewired based image representations together with exemplar-based parts provide added flexibility and should lead to enhanced authentication performance.

The model-free and non-parametric recognition-by-parts architecture proposed in the present invention handles so far only frontal images possibly affected by adverse data capture conditions. It may be possible to expand and include the pose as another biometric adversarial dimension using rewiring operations as described above. Layered categorization may start with face detection. But now it may seek one of three possible poses using boosting driven by relevant parts. The poses contemplated may be left, frontal, and right, with further quantization being possible. Patches and parts may now be described using an extended vocabulary of "rewired" operators, both quantitative and qualitative in design. Another fruitful venue for further research is to migrate from spatial to spatial-temporal processing using both parts and events. The parts and temporal events play the role of weak learners and compete for their inclusion in the strong classifiers used for layered categorization. The functionality described corresponds to face selection.

Face selection expands on the traditional role of face recognition. It assumes that multiple image sets for each enrollee are available for training, and that a data streaming sequence of face images, possibly acquired from CCTV, becomes available during surveillance. The goal is to identify the subset of (CCTV) frames, if any, where each enrolled subject shows up. Subjects appear and disappear as time progresses and the presence of any face is not necessarily continuous across (video) frames. Faces belonging to different subjects thus appear in a sporadic fashion across the sequence. Some of the CCTV frames could actually be void of any face, while other frames could include occluded or disguised faces from different subjects. Kernel k-means and/or spectral clustering using patches, parts, and strangeness for distance ("affinity") may be used for face selection.

XIII. REFERENCES

A. B. Ashraf, S. Lucey, and T. Chen (2008), Learning Patch Correspondences for Improved Viewpoint Invariant Face Recognition, CVPR, Anchorage, Ak.

K. Anderson and P. McOwan (2004), Robust Real-Time Face Tracker for Cluttered Environments, Computer Vision and Image Understanding, Vol. 95, 184-200.

B. J. Balas and P. Sinha (2006), Region-Based Representations for Face Recognition, ACM Transactions on Applied Perception, Vol. 3, No. 4, 354-375.

H. B. Barlow (1989), Unsupervised Learning, Neural Computation, Vol. 1, 295-311.

B. Black, F. J. Ayala, and C. Saffran-Brinks (1994), Science and the Law in the Wake of Daubert: A New Search for Scientific Knowledge, Texas Law Rev., Vol. 72, No. 4, 715-761.

C. Champod and D. Meuwly (2000), The Inference of Identity in Forensic Speaker Recognition, Speech Communication, Vol. 31, 193-203.

O. Chapelle, B. Scholkopf, and A. Zien (Eds.) (2006), Semi-Supervised Learning, MIT Press.

V. Cherkassky and F. Mulier (2007), Learning from Data, 2nd ed., Wiley.

H. Cott (1966), Adaptive Coloration in Animals (3rd. ed.), Methuen & Co., London.

T. M. Cover and P. Hart (1967), Nearest Neighbor Pattern Classification, IEEE Trans. on Info. Theory, Vol. IT-13, 21-27.

D. Dessimoz and C. Champod (2008), Linkages Between Biometrics and Forensic Science, in Handbook of Biometrics, Anil K. Jain et al., Eds, Springer.

I. S. Dhillon, Y. Guan, and B. Kulis (2004), Kernel k-means, Spectral Clustering and Normalized Cuts, KDD, Seattle, Wash.

R. O. Duda, P. E. Hart, and D. G. Sork (2000), Pattern Classification (2nd. ed.), Wiley.

G. M. Edelman (1987), Neural Darwinism. The Theory of Neuronal Group Selection, Basic Books, NY.

R. El-Yaniv and L. Gerzon (2005), Effective Transductive Learning via Objective Model Selection, Pattern Recognition Letters, Vol. 26, 2104-2115.

M. A. Fischler and R. A. Elschlager (1973), The Representation and Matching of Pictorial Structures, IEEE Trans. on Computers, Vol. C-22, No. 1, 67-92.

Y. Freund and R. E. Shapire (1996), Experiments with a New Boosting Algorithm, $13^{th}$ Int. Conf. on Machine Learning (ICML), 148-156, Bari, Italy.

F. H. Friedman, T. Hastie, and R. Tibshirani (2000), Additive Logistic Regression: A Statistical View of Boosting., Annals of Statistics 28, 337-407.

J. Gonzalez-Rodriguez, P. Rose, D. Ramos, D. T. Toledano, and J. Ortega-Garcia (2007), Emulating DNA: Rigorous Quantification of Evidential Weight in Transparent and Testable Forensic Speaker Recognition", IEEE Trans. on Audio, Speech and Language Processing, Vol. 15, no. 7, 2104-2115.

E. Gurari and H. Wechsler (1982), On the Difficulties Involved in the Segmentation of Pictures, IEEE Trans. on Pattern Analysis and Machine Intelligence, Vol. 4, No. 3, 304-306.

S. Gutta and H. Wechsler (2004), Face Recognition Using Asymmetric Faces, 1st Int. Conf. on Biometric Authentication, Hong Kong, China.

B. Heisele, P. Ho, J. Wu, and T. Poggio (2003), Face Recognition: Component-Based versus Global Approaches, Computer Vision and Image Understanding, 91, 6-21.

B. Heisele, T. Serre, and T. Poggio (2007), A Component-Based Framework for Face Detection and Identification, Int. J. of Comp. Vision, Vol. 74, No. 2, 167-181.

S. S. Ho and H. Wechsler (2008), Query by Transduction, IEEE Trans. on Pattern Analysis and Machine Intelligence, Vol. 30, No. 9, 1557-1571.

D. Koller and M. Sahami (1996), Toward Optimal Feature Selection, 13th Int. Conf. on Machine Learning (ICML), Bari, Italy.

M. Lades, J. C. Vorbruggen, J. Buhmann, C. Malsburg, R. P. Wurtz, and W. Konen (1993), Distortion Invariant Object Recognition in the Dynamic Link Architecture, IEEE Trans. on Computers, Vol. 42, 300-311.

H. Lai, V. Ramanat, and H. Wechsler (2008), Robust Face Recognition Using Adaptive and Robust Correlation Filters, Computer Vision and Image Understanding, Vol. 111, No. 3, 329-350.

M. Li and P. Vitanyi (1997), An Introduction to Kolmogorov Complexity and Its Applications (2nd ed.), Springer-Verlag.

F. Li and H. Wechsler (2005), Open Set Face Recognition Using Transduction, IEEE Trans. on Pattern Analysis and Machine Intelligence, Vol. 27, No. 11, 1686-1698.

S. Lucey and T. Chen (2006), Learning Patch Dependencies for Improved Pose Mismatched Face Verification, CVPR, NY, N.Y.

D. G. Lowe (2004), Distinctive Image Features from Scale—Invariant Key Points, Int. Journal of Computer Vision, Vol. 60, No. 2, 91-110.

D. McNeill (1998), The Face—A Natural History, Little, Brown and Co.

T. Melluish, C. Saunders, A. Gammerman, and V. Vovk (2001), The Typicalness Framework: A Comparison with the Bayesian Approach, TR-CS, Royal Holloway College, Univ. of London.

P. J. Phillips, P. J. Flynn, T. Scruggs, K. W. Bowyer, J. Chang, K. Hoffman, J. Marques, J. Min, and W. Worek (2005), Overview of the Face Recognition Grand Challenge, Computer Vision and Pattern Recognition (CVPR), New York, N.Y.

N. Pinto, D. D. Cox and J. J. DiCarlo (2008), Why Is Real-World Visual Object Recognition Hard? PLOS Computational Biology, Vol. 4, No. 1, 151-156.

K. Prodrou, I. Nouretdinov, V. Vovk, and A. Gammerman (2002), Transduction Confidence Machine for Pattern Recognition, Proc. 13th European Conf. on Machine Learning (ECML), 381-390, Helsinki, Finland.

M. Robnik-Sikonja and I. Kononenko (2003), Theoretical and Empirical Analysis of Relief F and RReliefF, J. of Machine Learning 53, 23-69.

Y. D. Rubinstein and T. Hastie (1997), Discriminative vs. Informative Learning, Knowledge and Data Discovery (KDD), 49-53.

R. V. Rullen, J. Gautrais, A. Delorme, and S. Thorpe (1998), Face Processing Using One Spike per Neuron, BioSystems, Vol. 48, 229-239.

T. Serre et al. (2007), Robust Object Recognition with Cortex-Like Mechanisms, IEEE Trans. on Pattern Analysis and Machine Intelligence, Vol. 29, No. 3, 411-425.

R. Singh, M. Vatsa, and A. Noore (2009), Face Recognition with Disguise and Single Gallery Images, Image and Vision Computing, Vol. 27, No. 3, 245-257.

P. Sinha et al. (2006), Face Recognition by Humans: Nineteen Results All Computer Vision Researchers Should Know About, Proc. IEEE, Vol. 94, No. 11, 1948-1962.

S. Thorpe, D. Fize, and C. Marlot (1996), Speed of Processing in the Human Visual System, Nature, Vol. 381, 520-522.

K. Tsunoda, Y. Yamane, M. Nishizaki, and M. Tanifuji (2001), Complex Objects Are Represented in Macaque Inferotemporal Cortex by the Combination of Feature Columns, Nature neuroscience, Vol. 4, No. 8, 832-838.

V. N. Vapnik (1998), Statistical Learning Theory, Wiley.

V. Vapnik. (2000), The Nature of Statistical Learning Theory (2nd ed.), Springer.

P. Viola and M. Jones (2001), Rapid Object Detection Using a Boosted Cascade of Simple Features, CVPR, Kauai, Hi.

V. Vovk, A. Gammerman, and C. Saunders (1999), Machine Learning Application of Algorithmic Randomness, 16th Int. Conf. on Machine Learning (ICML), Bled, Slovenia.

L. Wiscott, J. M. Fellous, N. Kruger, and C. von der Malsburg (1997), Face Recognition by Elastic Bunch Graph Matching, IEEE Trans. on Pattern Analysis and Machine Intelligence, Vol. 19, No. 7, 775-779.

The foregoing descriptions of the embodiments of the present invention have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the present invention and its practical application to thereby enable others skilled in the art to best utilize it in various embodiments and with various modifications as are suited to the particular use contemplated without departing from the spirit and scope of the present invention. In fact, after reading the above description, it will be apparent to one skilled in the relevant art(s) how to implement the present invention in alternative embodiments. Thus, the present invention should not be limited by any of the above described example embodiments. For example, the present invention may be practiced over any object, such as airplanes, cars, trees, plants, pets, etc.

In addition, it should be understood that any figures, graphs, tables, examples, etc., which highlight the functionality and advantages of the present invention, are presented for example purposes only. The architecture of the disclosed is sufficiently flexible and configurable, such that it may be utilized in ways other than that shown. For example, the steps listed in any flowchart may be reordered or only optionally used in some embodiments.

In this specification, "a" and "an" and similar phrases are to be interpreted as "at least one" and "one or more."

Many of the elements described in the disclosed embodiments may be implemented as modules. A module is defined here as an isolatable element that performs a defined functions and has a defined interface to other elements. The modules described in this disclosure may be implemented in hardware, software, firmware, wetware (i.e. hardware with a biological element) or a combination thereof, all of which are behaviorally equivalent. For example, modules may be implemented as a software routine written in a computer language (such as C, C++, FORTRAN, Java, Basic, Malta or the like) or a modeling/simulation program such as SimuLink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by any-one of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What are claimed are:

1. A robust recognition-by-parts face authentication system for determining if at least one query image obtained using an imaging device matches at least one training image in an enrollment gallery comprising:
    a. an enrollment module comprising:
        1) an enrollment patch extractor configured for extracting a multitude of training patches at different scales for each center position of the training image;
        2) an enrollment patch processor configured for:
            a) selecting the training patches that are predictive in identifying the training image; and
            b) reducing the selected training patches' dimensionality using transduction;
        3) an enrollment part clustering module configured for clustering the selected training patches into training exemplar-based parts for matching and authentication using K-means;
        4) an enrollment data fusion module configured for enrolling the training exemplar-based parts using boosting and transduction;
    b. a query module comprising:
        1) a query patch extractor configured for extracting a multitude of query patches at different scales for each center position of the query image;
        2) a query patch processor configured for:
            a) selecting the query patches that are predictive in identifying the query target; and
            b) reducing the selected query patches' dimensionality using transduction;
        3) a query part clustering module configured for clustering the selected query patches into query exemplar-based parts for matching and authentication using K-means; and
    c. an ID authentication module configured for matching the query exemplar-based parts against a gallery of all the enrolled training exemplar-based parts using flexible matching.

2. The robust recognition-by-parts face authentication system according to claim 1, wherein the enrollment patch extractor uses SIFT for extracting the training patches.

3. The robust recognition-by-parts face authentication system according to claim 1, wherein the enrollment patch extractor uses Gabor wavelet for extracting the training patches.

4. The robust recognition-by-parts face authentication system according to claim 1, wherein the query patch extractor uses SIFT for extracting the query patches.

5. The robust recognition-by-parts face authentication system according to claim 1, wherein the query patch extractor uses Gabor wavelet for extracting the query patches.

6. The robust recognition-by-parts face authentication system according to claim 1, further including a training image preprocessor module configured for preprocessing at least one training image by:
    a. converting 256 gray levels into floating points;
    b. using geometric normalization that lines up chosen eye coordinates;
    c. cropping the training image using an elliptical mask;
    d. equalizing a histogram of the training image; and
    e. normalizing pixel values to mean zero and variance of one.

7. A robust recognition-by-parts face authentication device for determining if at least one query image obtained using an imaging device matches at least one training image in an enrollment gallery comprising:
    a. an enrollment module comprising:
        1) an enrollment patch extractor configured for extracting a multitude of training patches at different scales for each center position of the training image;
        2) an enrollment patch processor configured for:
            a) selecting the training patches that are predictive in identifying the training image; and
            b) reducing the selected training patches' dimensionality using transduction;
        3) an enrollment part clustering module configured for clustering the selected training patches into training exemplar-based parts for matching and authentication using K-means;
        4) an enrollment data fusion module configured for enrolling the training exemplar-based parts using boosting and transduction;
    b. a query module comprising:
        1) a query patch extractor configured for extracting a multitude of query patches at different scales for each center position of the query image;
        2) a query patch processor configured for:
            a) selecting the query patches that are predictive in identifying the query target; and
            b) reducing the selected query patches' dimensionality using transduction;
        3) a query part clustering module configured for clustering the selected query patches into query exemplar-based parts for matching and authentication using K-means; and
    c. an ID authentication module configured for matching the query exemplar-based parts against a gallery of all the enrolled training exemplar-based parts using flexible matching.

8. The robust recognition-by-parts face authentication device according to claim 7, wherein the enrollment patch extractor uses SIFT for extracting the training patches.

9. The robust recognition-by-parts face authentication device according to claim 7, wherein the enrollment patch extractor uses Gabor wavelet for extracting the training patches.

10. The robust recognition-by-parts face authentication device according to claim 7, wherein the query patch extractor uses SIFT for extracting the query patches.

11. The robust recognition-by-parts face authentication device according to claim 7, wherein the query patch extractor uses Gabor wavelet for extracting the query patches.

12. The robust recognition-by-parts face authentication device according to claim 7, further including a training image preprocessor module configured for preprocessing at least one training image by:

a. converting 256 gray levels into floating points;
b. using geometric normalization that lines up chosen eye coordinates;
c. cropping the training image using an elliptical mask;
d. equalizing a histogram of the training image; and
e. normalizing pixel values to mean zero and variance of one.

13. A physical and tangible computer readable medium encoded with instructions for determining if at least one query image obtained using an imaging device matches at least one training image in an enrollment gallery, wherein execution of the instructions by one or more processors causes the one or more processors to perform the steps comprising:
   a. extracting a multitude of training patches at different scales for each center position of the training image;
   b. processing the training patches by:
      1) selecting the training patches that are predictive in identifying the training image; and
      2) reducing the selected training patches' dimensionality using transduction;
   c. clustering the selected training patches into training exemplar-based parts for matching and authentication using K-means;
   d. enrolling the training exemplar-based parts using boosting and transduction;
   e. extracting a multitude of query patches at different scales for each center position of the query image;
   f. processing the query patches by:
      1) selecting the query patches that are predictive in identifying the query target; and
      2) reducing the selected query patches' dimensionality using transduction;
   g. clustering the selected query patches into query exemplar-based parts for matching and authentication using K-means; and
   h. matching the query exemplar-based parts against a gallery of all the enrolled training exemplar-based parts using flexible matching.

14. The physical and tangible computer readable medium according to claim 13, wherein SIFT is used for extracting the training patches.

15. The physical and tangible computer readable medium according to claim 13, wherein Gabor wavelet is used for extracting the training patches.

16. The physical and tangible computer readable medium according to claim 13, wherein SIFT is used for extracting the query patches.

17. The physical and tangible computer readable medium according to claim 13, wherein Gabor wavelet is used for extracting the query patches.

18. The physical and tangible computer readable medium according to claim 13, further including preprocessing at least one training image by:
   a. converting 256 gray levels into floating points;
   b. using geometric normalization that lines up chosen eye coordinates;
   c. cropping the training image using an elliptical mask;
   d. equalizing a histogram of the training image; and
   e. normalizing pixel values to mean zero and variance of one.

* * * * *